(12) United States Patent
Burkitt et al.

(10) Patent No.: US 12,323,673 B2
(45) Date of Patent: Jun. 3, 2025

(54) AUDIOVISUAL CONTENT ITEM TRANSCRIPT SEARCH ENGINE

(71) Applicant: Comcast Cable Communications, LLC, Philadelphia, PA (US)

(72) Inventors: Kevin J. Burkitt, Palo Alto, CA (US); Eoin G. Dowling, Palo Alto, CA (US); Michael M. Bennett, Redwood City, CA (US); Trevor R. Branon, San Francisco, CA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

(21) Appl. No.: 13/840,103

(22) Filed: Mar. 15, 2013

(65) Prior Publication Data

US 2013/0291019 A1   Oct. 31, 2013

Related U.S. Application Data

(60) Provisional application No. 61/749,889, filed on Jan. 7, 2013, provisional application No. 61/639,829, filed on Apr. 27, 2012.

(51) Int. Cl.
*G06F 16/78* (2019.01)
*G06F 16/783* (2019.01)
(Continued)

(52) U.S. Cl.
CPC ..... *H04N 21/4828* (2013.01); *G06F 16/7834* (2019.01); *G06F 16/7844* (2019.01);
(Continued)

(58) Field of Classification Search
CPC .................. G06F 17/30864; G06F 16/7844
(Continued)

(56) References Cited

U.S. PATENT DOCUMENTS 5,946,050 A   8/1999   Wolff
6,502,065 B2   12/2002   Imanaka et al.
(Continued)

FOREIGN PATENT DOCUMENTS

GB   2388738 A   11/2003
KR   100828166 B1   5/2008
WO   2008011142 A2   1/2008

OTHER PUBLICATIONS

International Search Report and Written Opinion, issued on Aug. 12, 2013, in corresponding application No. PCT/US2013/037866, 12 pages.
(Continued)

*Primary Examiner* — Mohammad S Rostami
(74) *Attorney, Agent, or Firm* — Banner & Witcoff, Ltd.

(57) ABSTRACT

Self-learning systems process data in real-time and output the processed data to client applications in an effective manner. They comprise a capture platform that captures data and generates a stream of text, a text decoding server that extracts individual words from the stream of text, an entity extractor that identifies entities, a trending engine that outputs trending results, and a live queue broker that filters the trending results. The self-learning systems provide more efficient realization of Boxfish technologies, and provide or work in conjunction with real-time processing, storage, indexing, and delivery of segmented video. Furthermore, the self-learning systems efficiently perform entity relationing by creating entity network graphs, and are operable to identify advertisements from the data.

32 Claims, 25 Drawing Sheets

(51) Int. Cl.
  *H04N 21/258* (2011.01)
  *H04N 21/266* (2011.01)
  *H04N 21/2668* (2011.01)
  *H04N 21/278* (2011.01)
  *H04N 21/482* (2011.01)
  *H04N 21/81* (2011.01)
  *G10L 15/08* (2006.01)
  *G10L 15/18* (2013.01)

(52) U.S. Cl.
  CPC . *H04N 21/25891* (2013.01); *H04N 21/26603* (2013.01); *H04N 21/2668* (2013.01); *H04N 21/278* (2013.01); *H04N 21/812* (2013.01); *G10L 2015/088* (2013.01); *G10L 15/1822* (2013.01)

(58) Field of Classification Search
  USPC .................................................. 707/713, 747
  See application file for complete search history.

(56) References Cited

U.S. PATENT DOCUMENTS

| | | | |
|---|---|---|---|
| 6,845,485 B1* | 1/2005 | Shastri | H04N 21/478 348/E7.071 |
| 6,961,954 B1 | 11/2005 | Maybury et al. | |
| 7,184,959 B2 | 2/2007 | Gibbon et al. | |
| 7,263,530 B2 | 8/2007 | Hu et al. | |
| 7,620,551 B2 | 11/2009 | Ho | |
| 7,856,358 B2 | 12/2010 | Ho | |
| 7,954,056 B2* | 5/2011 | Graham | G06F 17/30017 715/716 |
| 8,042,053 B2 | 10/2011 | Darwish et al. | |
| 8,151,194 B1 | 4/2012 | Chan et al. | |
| 8,176,046 B2 | 5/2012 | Druzgalski et al. | |
| 8,176,068 B2 | 5/2012 | Kunjithapatham et al. | |
| 8,196,164 B1 | 6/2012 | Oztaskent et al. | |
| 8,255,948 B1 | 8/2012 | Black et al. | |
| 8,281,339 B1* | 10/2012 | Walker | H04N 21/4755 705/14.4 |
| 8,332,895 B2 | 12/2012 | Nathan et al. | |
| 8,370,348 B1 | 2/2013 | Reilly et al. | |
| 8,429,170 B2 | 4/2013 | Ittiachen | |
| 8,538,563 B1* | 9/2013 | Barber | G07F 17/3276 463/28 |
| 8,539,359 B2 | 9/2013 | Rapaport et al. | |
| 8,615,442 B1 | 12/2013 | Kapur et al. | |
| 8,702,504 B1 | 4/2014 | Hughes et al. | |
| 8,762,326 B1 | 6/2014 | Zhou et al. | |
| 8,769,576 B2 | 7/2014 | Burkitt et al. | |
| 8,776,149 B1 | 7/2014 | Koch et al. | |
| 8,826,131 B2 | 9/2014 | Suito et al. | |
| 8,838,564 B2 | 9/2014 | Sahni et al. | |
| 8,849,829 B2 | 9/2014 | Shalabi et al. | |
| 8,862,573 B2* | 10/2014 | Musgrove | 707/722 |
| 8,898,166 B1* | 11/2014 | Navrides | G06F 16/9024 705/342 |
| 8,904,436 B2 | 12/2014 | Kang et al. | |
| 8,995,767 B2* | 3/2015 | Graham | G06F 17/30017 382/173 |
| 9,100,669 B2 | 8/2015 | Feng et al. | |
| 9,100,679 B2 | 8/2015 | Burkitt et al. | |
| 9,110,977 B1 | 8/2015 | Pierre et al. | |
| 9,253,511 B2 | 2/2016 | Chen et al. | |
| 9,445,036 B2 | 9/2016 | Hamano et al. | |
| 9,491,522 B1 | 11/2016 | Trollope et al. | |
| 9,544,650 B1* | 1/2017 | Oztaskent | H04N 21/8358 |
| 9,544,656 B1* | 1/2017 | Nichols | G06K 9/6202 |
| 9,628,873 B2 | 4/2017 | Hu et al. | |
| 9,659,313 B2* | 5/2017 | Tsai | G06Q 30/0269 |
| 9,668,023 B1 | 5/2017 | Twyman et al. | |
| 9,799,375 B2* | 10/2017 | Zhou | G11B 27/28 |
| 9,826,188 B2* | 11/2017 | Jackson | H04N 5/44513 |
| 10,149,008 B1 | 12/2018 | Logan | |
| 10,228,818 B2 | 3/2019 | Vandermolen et al. | |
| 2001/0003214 A1* | 6/2001 | Shastri | H04N 21/4758 348/E7.071 |
| 2002/0073424 A1* | 6/2002 | Ward, III | H04N 21/458 348/E7.071 |
| 2003/0140083 A1* | 7/2003 | Watkins | H04L 67/75 719/310 |
| 2004/0025180 A1 | 2/2004 | Begeja et al. | |
| 2004/0090462 A1* | 5/2004 | Graham | G06F 16/34 715/767 |
| 2004/0095376 A1* | 5/2004 | Graham | G06F 16/40 715/716 |
| 2004/0225667 A1 | 11/2004 | Hu et al. | |
| 2005/0028194 A1 | 2/2005 | Elenbaas et al. | |
| 2005/0166242 A1 | 7/2005 | Matsumoto et al. | |
| 2005/0198006 A1* | 9/2005 | Boicey | G06F 16/7844 725/38 |
| 2005/0251823 A1 | 11/2005 | Saarikivi | |
| 2006/0152504 A1* | 7/2006 | Levy | G06F 16/9538 707/E17.109 |
| 2006/0288389 A1 | 12/2006 | Deutscher et al. | |
| 2007/0043761 A1 | 2/2007 | Chim et al. | |
| 2007/0113255 A1 | 5/2007 | Kurosawa | |
| 2007/0118364 A1 | 5/2007 | Wise et al. | |
| 2007/0239686 A1 | 10/2007 | Quinn-Jacobs | |
| 2007/0244902 A1* | 10/2007 | Seide | G06F 16/78 |
| 2008/0021755 A1* | 1/2008 | Jones | G06Q 10/06 705/7.42 |
| 2008/0028292 A1* | 1/2008 | Graham | G06F 16/9577 715/230 |
| 2008/0033826 A1* | 2/2008 | Maislos | G06Q 30/00 705/14.66 |
| 2008/0066136 A1 | 3/2008 | Dorai et al. | |
| 2008/0077574 A1 | 3/2008 | Gross | |
| 2008/0077581 A1 | 3/2008 | Drayer et al. | |
| 2008/0083003 A1 | 4/2008 | Biniak et al. | |
| 2008/0086688 A1 | 4/2008 | Chandratillake et al. | |
| 2008/0086754 A1* | 4/2008 | Chen | H04L 29/06027 725/105 |
| 2008/0091722 A1 | 4/2008 | Wendelrup | |
| 2008/0140385 A1 | 6/2008 | Mahajan et al. | |
| 2008/0147487 A1* | 6/2008 | Hirshberg | 705/10 |
| 2008/0225167 A1* | 9/2008 | Beermann | H04N 21/4345 348/731 |
| 2008/0228928 A1* | 9/2008 | Donelli | G06F 17/30029 709/228 |
| 2008/0281783 A1* | 11/2008 | Papkoff | G06F 17/30029 |
| 2008/0301128 A1 | 12/2008 | Gandert et al. | |
| 2008/0313146 A1* | 12/2008 | Wong | G06F 16/78 |
| 2009/0055393 A1 | 2/2009 | Messer et al. | |
| 2009/0063134 A1* | 3/2009 | Gallagher | G06F 16/313 704/10 |
| 2009/0064247 A1 | 3/2009 | Biniak et al. | |
| 2009/0083677 A1 | 3/2009 | Darwish et al. | |
| 2009/0094286 A1 | 4/2009 | Lee et al. | |
| 2009/0157720 A1* | 6/2009 | Kolcz | G06Q 10/10 |
| 2009/0254562 A1 | 10/2009 | Casaccia | |
| 2009/0276419 A1* | 11/2009 | Jones | G06F 16/332 |
| 2009/0276500 A1 | 11/2009 | Karmarkar | |
| 2009/0282454 A1* | 11/2009 | Ekstrand | H04N 21/64315 725/134 |
| 2009/0313658 A1* | 12/2009 | Nishimura | H04N 21/431 725/59 |
| 2010/0071013 A1 | 3/2010 | Vandermolen et al. | |
| 2010/0083307 A1 | 4/2010 | Zalewski | |
| 2010/0100537 A1 | 4/2010 | Druzgalski et al. | |
| 2010/0138859 A1 | 6/2010 | Ko | |
| 2010/0141655 A1* | 6/2010 | Belinsky | G11B 27/10 345/440 |
| 2010/0153107 A1* | 6/2010 | Kawai | G06Q 10/04 705/347 |
| 2010/0223056 A1* | 9/2010 | Kadirkamanathan | G10L 13/08 704/E15.005 |
| 2010/0303436 A1 | 12/2010 | Chang et al. | |
| 2010/0306232 A1* | 12/2010 | Heminghous | G06F 16/70 707/769 |
| 2010/0306805 A1 | 12/2010 | Neumeier et al. | |

(56) References Cited

U.S. PATENT DOCUMENTS

| | | | |
|---|---|---|---|
| 2010/0333137 A1* | 12/2010 | Hamano | H04N 21/458 725/39 |
| 2011/0099195 A1 | 4/2011 | Patwardhan et al. | |
| 2011/0112832 A1* | 5/2011 | Prorock | G11B 27/36 704/235 |
| 2011/0125550 A1 | 5/2011 | Erhart et al. | |
| 2011/0125847 A1* | 5/2011 | Cocheu | G06Q 10/10 709/204 |
| 2011/0154183 A1* | 6/2011 | Burns | H04L 65/40 707/706 |
| 2011/0196874 A1 | 8/2011 | Ittiachen et al. | |
| 2011/0202515 A1* | 8/2011 | Stiers | G06F 16/435 707/706 |
| 2011/0258676 A1* | 10/2011 | Gaskins, III | H04N 21/812 725/112 |
| 2011/0282874 A1 | 11/2011 | Xu et al. | |
| 2011/0307497 A1* | 12/2011 | Connor | 707/749 |
| 2011/0314006 A1 | 12/2011 | Sweeney et al. | |
| 2011/0320715 A1 | 12/2011 | Ickman et al. | |
| 2012/0005224 A1 | 1/2012 | Ahrens et al. | |
| 2012/0030013 A1 | 2/2012 | Tsay et al. | |
| 2012/0054795 A1 | 3/2012 | Kang et al. | |
| 2012/0066073 A1 | 3/2012 | Dilip et al. | |
| 2012/0066226 A1 | 3/2012 | Moshrefi et al. | |
| 2012/0109902 A1 | 5/2012 | Rozensztejn et al. | |
| 2012/0109944 A1 | 5/2012 | Hao | |
| 2012/0151079 A1 | 6/2012 | Besehanic et al. | |
| 2012/0209841 A1 | 8/2012 | Saretto et al. | |
| 2012/0226769 A1 | 9/2012 | Basso et al. | |
| 2012/0227064 A1 | 9/2012 | Neill | |
| 2012/0233256 A1 | 9/2012 | Shaham et al. | |
| 2012/0240144 A1 | 9/2012 | Rose | |
| 2012/0254917 A1* | 10/2012 | Burkitt | G06F 17/30817 725/40 |
| 2012/0278837 A1 | 11/2012 | Curtis et al. | |
| 2012/0291070 A1 | 11/2012 | Feng et al. | |
| 2012/0296920 A1 | 11/2012 | Sahni et al. | |
| 2013/0007043 A1* | 1/2013 | Phillips | G06F 16/48 707/769 |
| 2013/0024440 A1* | 1/2013 | Dimassimo | G06F 16/951 707/706 |
| 2013/0074109 A1 | 3/2013 | Skelton et al. | |
| 2013/0097259 A1* | 4/2013 | Li | H04L 51/26 709/206 |
| 2013/0108242 A1* | 5/2013 | Oliver | H04N 21/4668 386/244 |
| 2013/0144869 A1 | 6/2013 | Shalabi et al. | |
| 2013/0198204 A1 | 8/2013 | Williams et al. | |
| 2013/0204825 A1 | 8/2013 | Su | |
| 2013/0246432 A1 | 9/2013 | Paskin et al. | |
| 2013/0254308 A1* | 9/2013 | Rose | H04N 21/4882 709/206 |
| 2013/0262575 A1 | 10/2013 | Xiong et al. | |
| 2013/0275429 A1 | 10/2013 | York et al. | |
| 2013/0275453 A1 | 10/2013 | Vyas et al. | |
| 2014/0046661 A1* | 2/2014 | Bruner | G06F 40/56 704/235 |
| 2014/0067373 A1* | 3/2014 | Wasserblat | G10L 15/02 704/9 |
| 2014/0067828 A1 | 3/2014 | Archibong et al. | |
| 2014/0123178 A1 | 5/2014 | Burkitt et al. | |
| 2014/0136526 A1* | 5/2014 | Calhoun | G06F 16/7844 707/723 |
| 2014/0164507 A1* | 6/2014 | Tesch | H04L 51/10 709/204 |
| 2014/0366068 A1 | 12/2014 | Burkitt et al. | |
| 2015/0012512 A1* | 1/2015 | Lam | G06F 16/248 707/706 |
| 2015/0052102 A1* | 2/2015 | Nihal | H04N 21/8456 707/610 |
| 2015/0071604 A1* | 3/2015 | Yamashita | G11B 27/34 386/241 |
| 2015/0341689 A1 | 11/2015 | Burkitt et al. | |
| 2016/0014482 A1 | 1/2016 | Chen et al. | |

OTHER PUBLICATIONS

International Search Report and Written Opinion, 6 pages—App PCT/US2012/031777, dated Oct. 12, 2012.
Extended European Search Report, EP Appl. No. 12763229.7 (PCT/US2012/031777), dated Feb. 25, 2015, 6 pages.
Jul. 16, 2019—Great Britain Office Action—GB 1419760.2.
Mar. 25, 2020—Great Britain Office Action—GB 1419760.2.
Mar. 18, 2020—Great Britain Search Report—GB 1419760.2.

* cited by examiner

FIG. 4

BOXFISH

Trending on Television
1. draft
2. obama
3. romney
4. immigration
5. apple
6. fed
7. secret service
8. andrew luck
9. john edwards
10. jimmy fallon

"draft" [EDIT]

ESPNHD SportsCenter
Time now for the "tones light cold hard facts" all six of these as you might imagine about the first round of the Nfl draft.
>> I liked the pick by..
*30 seconds ago*

NFL Network HD NFL Total Access
>> How many teams has jerry jones made a trade on draft day.
>> More than once?
>> Think multiple. 59 trades on draft day or draft days over..

ESPN News Highlight Express
An extra fourth-round pick then they come

Discover new TV. Enter a keyword, we will let you know as it is mentioned   [SEARCH]

"romney" [EDIT]

xxxxxx Early Start
Governor Romney and the president both agree student loan interest rates on federally subsidized loans shouldn't be raised to 8.9%. A lot but should stay at 3.4%. A lot of talk about education, higher FOX Business News Best of Imus in the Morning
>> Imus: xxx will not be on the business, then, of suggesting who Romney should pick?
>> Guest xxx don't care who he picks.
>> Imus: I like Miller, but I don't think...

MSNBC The Rachel Maddow Show
The fact we have vice president Biden making a ...

"draft" [EDIT]

MSNBC The Rachel Maddow Show
We've been in a busy season for recalls these days. Russell Pearce, head of the Arizona State Senate who rammed through the Arizona immigration papers please....

Turner Network TUHD Law & Order
Immigration says Mrs. Shelby was in New York at the time of David's death. She and David had flown from Mexico City. (xxx during their visit. David Shelby died of an...

CSPAN2 Today in Washington
The reason is the immigration provisions that we said previously...

FIG. 7

Mixaroo

Manage Your Custom Stream — 705

LIVE Capitol Hill
21:11 Local

BREAKING NEWS
US STATE OF THE UNION
President Obama delivers address for second time Tweet  f Share BBC News 24: State of the Union Speech

706

704

701

Interactive Transcript

Only in Washington can you be watching the State of the Union with a member of another party. In the light of the Arizona or shootings there is a realization that Americans are fed up with the tone of the debate.

The partisanship we saw immediately after the shootings is not something that the American public feels comfortable with. So they have decided to i team up one Republican with one Democrat and have them sit together.

That is the theme of the night. Both sides, at least for an evening, will try to find common ground. Obamas speech is shot through with testimonials to compromise and working together. He has been doing that since the election. He has brought corporate executives into the White House. He is channelling Ronald Reagan. The legacy of the Tucson shootings a few weeks ago.

Almost everyone of the Cabinet members are is wearing black and white ribbons on their lapels in deference to what happened in Tucson.

To what extent Katty are we seeing the effects of Tucson? Promises of bipartisanship Barres and as apple pie and ice cream. And usually the promise expires after 32 seconds.

Partisanship is more the norm in Washington. Tonight everyone is making a big effort. There will be the empty seat of congresswoman Gabrielle Giffords. She is not dead tonight but there will be an empty seat for her and the President will PGY pay tribute to her. The promise of this partisanship staying will be whether the parties decide it is in their best interest.

Trending

State of the Union
Thundercats
Moscow
Wikileaks
Arizona
Tunisia
Floods
Google

Custom TV
Discover
Shared 702, 703

Rickie Gervais Golden Globe Scandal | Liverpool vs Man u highlights | Audi R8 reviewed in Top Gear | Muse Live at the Channel 4 Music Awards | Tron reviewed on the Culture Show | Oscar Award Nominations

FIG. 11B

Channel: Comcast Sportsnet Mid-Atlantic
NBC Sports Network
Science Channel
SNBC
SPEED Program: JFK Jr.'s Final 24
Hunter S. Thompson's Final 24
M*A*S*H
MTV2's Guy Code Mentions: signing day
signature recipe
sestito
shareable pool
southern mississippi

KEEPING UP WITH KARDASHIANS

Live Mentions of keeping

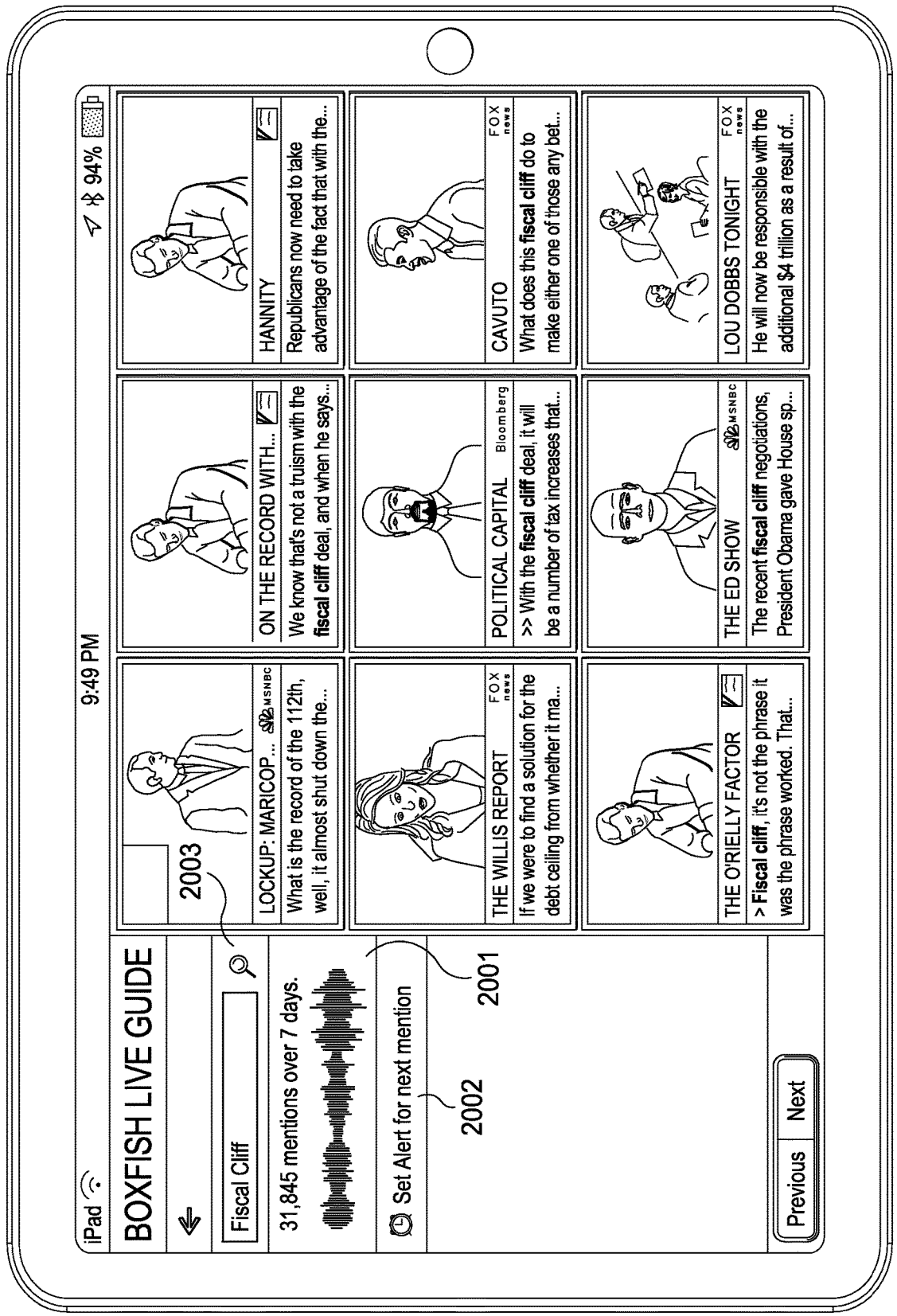

AUDIOVISUAL CONTENT ITEM TRANSCRIPT SEARCH ENGINE

CROSS-REFERENCE TO RELATED APPLICATIONS

This application claims priority to U.S. Provisional Patent Application No. 61/639,829, filed on Apr. 27, 2012 and entitled "Self-Learning Methods, Entity Relations, Remote Control, And Other Features For Real-Time Processing, Storage, Indexing, and Delivery of Segmented Video" and to U.S. Provisional Patent Application No. 61/749,889, filed on Jan. 7, 2013 and entitled "Real-Time Television Monitoring, Tracking and Control System." This application also relates to and adds additional features to copending U.S. patent application Ser. No. 13/436,973, and PCT Application No. PCT/US12/31777, both filed on Apr. 1, 2012 and entitled "System And Method For Real-Time Processing, Storage, Indexing, And Delivery Of Segmented Video." All of the foregoing patent applications are hereby incorporated by reference herein for all purposes.

TECHNICAL FIELD

The present disclosure relates generally to systems and methods that provide for indexing, storage, and access to video broadcasts and to control of television or other video devices using such indexed and presented information.

BACKGROUND

Broadcast television is a constantly changing medium with linear programming schedules. Multiple forms of recording devices exist to satisfy a consumer's need to record selected programming at their own convenience, but many require consumers to know in advance what programming they want to record. Programming that has not been recorded cannot be viewed later.

Broadcast television is localized by satellite, cable, or antenna coverage. Even though content partnership between networks is common, the delivery is still regional.

Internet Protocol television (IPTV) solutions are emerging to deliver content 'on demand' by exploiting the internet as a global delivery medium, but the large cost of bandwidth and streaming services for long form content delivery, coupled with licensing costs and restrictions, hamper wide scale distribution.

There are also infrastructure and development costs for creating such delivery platforms. These costs mean that a company must have either large-scale user numbers, or introduce premium content to attract the audience and generate a viable income.

User generated content sites such as YouTube have begun to attract the attention of content producers as a medium for delivery, in particular, time-sensitive content such as news broadcasts. These sites go some way in providing content to users in a timely manner, but indexing is driven by manually generated program titles, descriptions, tags, and other processes that cause delays. For news information in particular, the absence of video content within a search engine's 'real-time results,' is an indication of a problem in this process—in particular when the story has already been aired, but a user must wait for someone to manually add the story so that it can later be watched.

Video advertising remains largely rooted in its broadcast television foundations. Advertising is based largely on broad channel or program demographics rather than explicit information about a program's content. On the internet, text-based advertising such as Google Adwords has proven to be more valuable with context-sensitive advertising.

While the increasing use of mobile devices delivers an emerging base of consumers, traditional long-play program formats are poorly suited to these users and their devices. Several formats have been defined and deployed for delivery of television streams to mobile devices. These formats, such as Digital Video Broadcasting-Handheld or DVB-H, are focused on replicating the television experience on mobile devices. But they do not address the more common use cases for mobile devices, which favor short-form content.

Furthermore, current systems are often unable to identify meaningful things that are mentioned in TV. Disclosed embodiments thus further address the problem that television systems are inefficient in that current TV program guides are designed and laid out as a spreadsheet that previews 30 minute or hour-long blocks of programming. A user must scroll through and filter these options in order to find what they want to watch. These blocks give them no understanding of what the program is actually about. Perhaps a brief description is provided, but they do not necessarily know what is being talked about in the program. For example, Sports Center talks about all sports, so a user who is only interested in Saint Louis Cardinals has no idea if something relevant to their interests is being spoken about at any given time. And because the Cardinals is a very specific subject that is not likely talked about a majority of the time, a user is more likely to miss a discussion about her topic of choice than to get lucky and tune in at the exact time the Cardinals are being talked about.

This problem translates to many different genres of television. Current TV program guides do not inform users of which celebrities are being featured on a show, or what specific news stories are being covered. Disclosed embodiments address the problem with current TV program guides, which is that a user must know what they want to see in order to find it.

SUMMARY

An embodiment of the system disclosed in this specification can process data in real-time and output the processed data to client applications, wherein the system comprises: a capture platform that captures data from a data source and generates a stream of text from the captured data; a text decoding server that extracts individual words from the stream of text; an entity extractor that identifies entities from the individual words; a trending engine that outputs trending results based on how frequently each entity is mentioned in the stream of text; and a live queue broker that filters the trending results according to preferences of the client applications and outputs the filtered trending results to the client applications.

In another embodiment, the entity extractor further identifies how often each entity co-appears with other entities in the stream of text. The entity extractor may further create an entity network graph based on how often each entity co-appears with the other entities in the stream of text, wherein the entity network graph is updated in real-time.

In another embodiment, the entity extractor identifies the entities from the individual words by determining their word type. In the present embodiment, the entity extractor may further identify patterns of the word types relating to the words in the stream of text. The word type of each word may be a noun, verb, adjective, adverb, singular, and/or plural. The entity extractor may determine the word type of each word in the stream of text by performing Part-Of-Speech (POS) tagging. The entity extractor may further filter false positives by determining how often the entities appear in the stream of text.

In another embodiment, the entity extractor further normalizes substantially the same entities to a common representation. The entity extractor may normalize substantially the same entities by analyzing aliases submitted by dictionaries.

In another embodiment, the entity extractor further categorizes each entity. The entity extractor may categorize each entity into a person, place, or thing. In another embodiment, the entity extractor further assigns time-codes, channel sources, and topics to the entities.

In another embodiment, the trending engine calculates trending results based on the rate of change of frequency of mentions versus historic and normalized frequency of mentions globally and across other subsets including channels, programs, and program genres. The trending engine may store the trending results as system wide results, as well as in separate category groups, in a trends database. The separate category groups may be regions, topic groups, and data source.

In another embodiment, the system further comprises an advertisement recognition component that is operable to identify advertisements from the stream of text. The advertisement recognition component may identify advertisements by keeping track of how often a certain sentence occurs. The advertisement recognition component may further filter the identified advertisements.

In another embodiment, the client application is a website interface, mobile device, and/or television. In another embodiment, the data source is a broadcast, cable, or IP-driven television.

BRIEF DESCRIPTION OF THE DRAWINGS

For a more complete understanding of the present disclosure and its advantages, reference is now made to the following description taken in conjunction with the accompanying drawings, in which like reference numbers indicate like features.

FIG. 4 illustrates an online example of a website interface employing the SLEN system;

FIG. 7 illustrates an example of a web client;

FIG. 11B illustrates an example embodiment of a TV employing an autocomplete feature;

FIG. 20 illustrates another example of the user interface that displays the application's search features and keyword options.

Although similar reference numbers may be used to refer to similar elements for convenience, it can be appreciated that each of the various example embodiments may be considered to be distinct variations.

The present embodiments will now be described hereinafter with reference to the accompanying drawings, which form a part hereof, and which illustrate example embodiments which may be practiced. As used in the disclosures and the appended claims, the terms "embodiment" and "example embodiment" do not necessarily refer to a single embodiment, although it may, and various example embodiments may be readily combined and interchanged, without departing from the scope or spirit of the present embodiments. Furthermore, the terminologies as used herein is for the purpose of describing example embodiments only, and are not intended to be limitations. In this respect, as used herein, the term "in" may include "in" and "on," and the terms "a," "an" and "the" may include singular and plural references. Furthermore, as used herein, the term "by" may also mean "from," depending on the context. Furthermore, as used herein, the term "if" may also mean "when" or "upon," depending on the context. Furthermore, as used herein, the words "and/or" may refer to and encompass any and all possible combinations of one or more of the associated listed items.

DETAILED DESCRIPTION

Search engines often fail or have difficulty in identifying meaningful words and phrases in television (TV) conversations, such as detecting words like "President Obama" or "Lady Gaga." A self-learning entity network (SLEN) system solves this problem by automatically recognizing entities and determining their relationships with each other. For example, once the SLEN system identifies entities "President Obama" and "White House," it can further learn that the two entities "President Obama" and "White House" are associated with each other. This feature may be used in various Boxfish technologies and features, such as Sentiment/Word cloud and search query reformulation.

Figure 1:
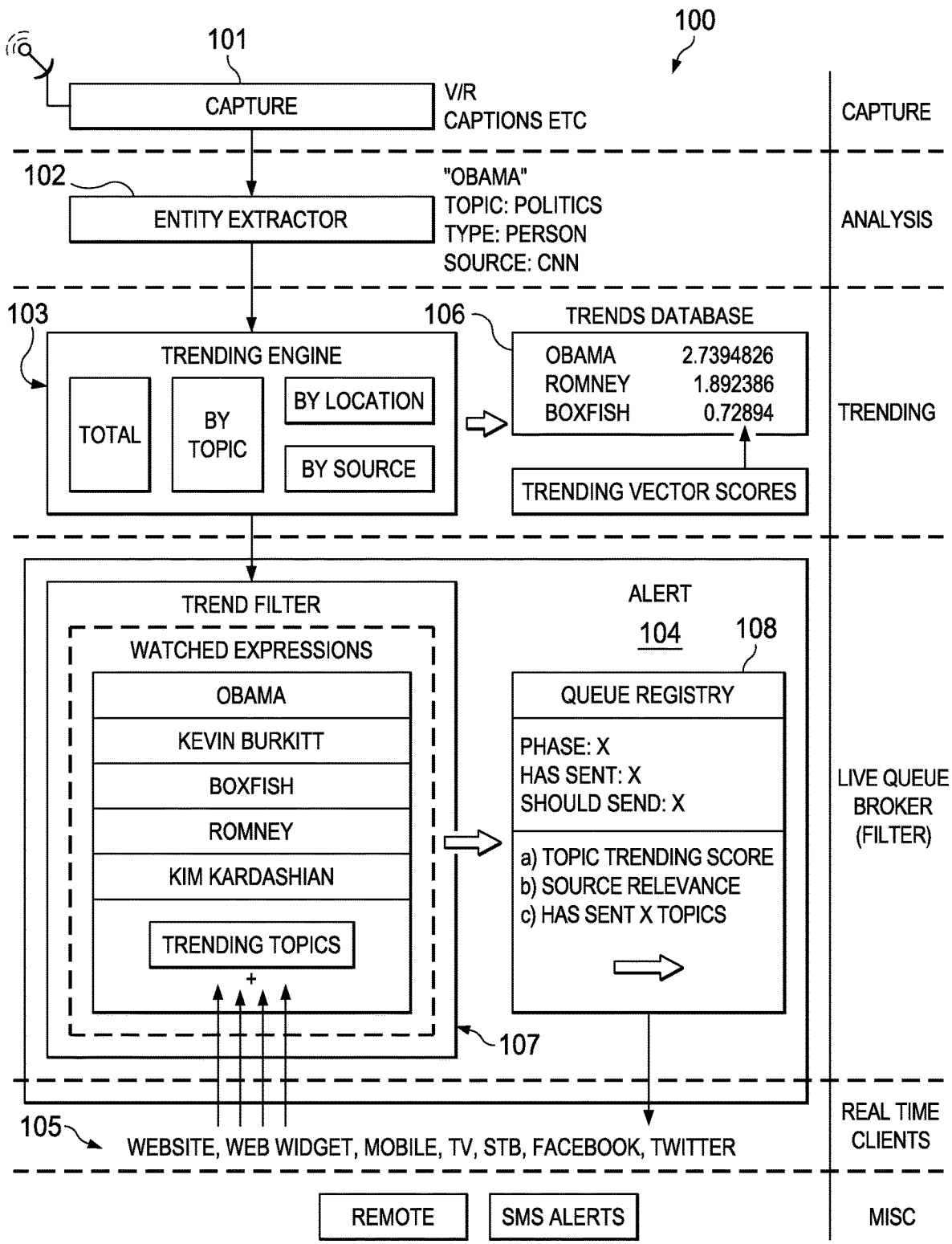
FIG. 1 illustrates an example embodiment of a system employed by a Boxfish technology.

FIG. 1 is an embodiment of a system 100 employed by various Boxfish technologies to realize different functionalities such as trending. The system 100 comprises a Capture Platform 101, an Entity Extractor 102, a Trending Engine 103, a Live Queue Broker 104, and client applications 105. The Capture Platform 101 captures source data from incoming video broadcasts and converts the source data into a standardized format. It may further include a Capture Server (not shown) that is deployed to local geographic regions and gathers the source data. The Entity Extractor 102 processes data using semantic and grammar processing, key term searches, input from EPG and Neilson Data, information from a Contextual Database, and other sources of information. While not shown in FIG. 1, a Topic Extractor or Topic Extraction may use the entities extracted by the Entity Extractor 102 to extract more general topics. Thus, in this embodiment, a topic is more general than an entity, wherein the topic is extracted based on the entity information. In another embodiment, however, a topic may be the same as an entity. The Trending Engine 103 may be connected to a trends database 106, and the Live Queue Broker 104 may comprise a trend filter 107 and a queue registry 108. The client applications 105 may be a web site, web widget, mobile, TV, Facebook, Twitter, or other suitable applications and devices employed by a client. These components are further described in copending U.S. patent application Ser. No. 13/436,973, and PCT Application No. PCT/US 12/31777, both filed on Apr. 1, 2012 and entitled "System And Method For Real-Time Processing, Storage, Indexing, And Delivery Of Segmented Video," which are hereby incorporated by reference in their entirety.

Figure 2:
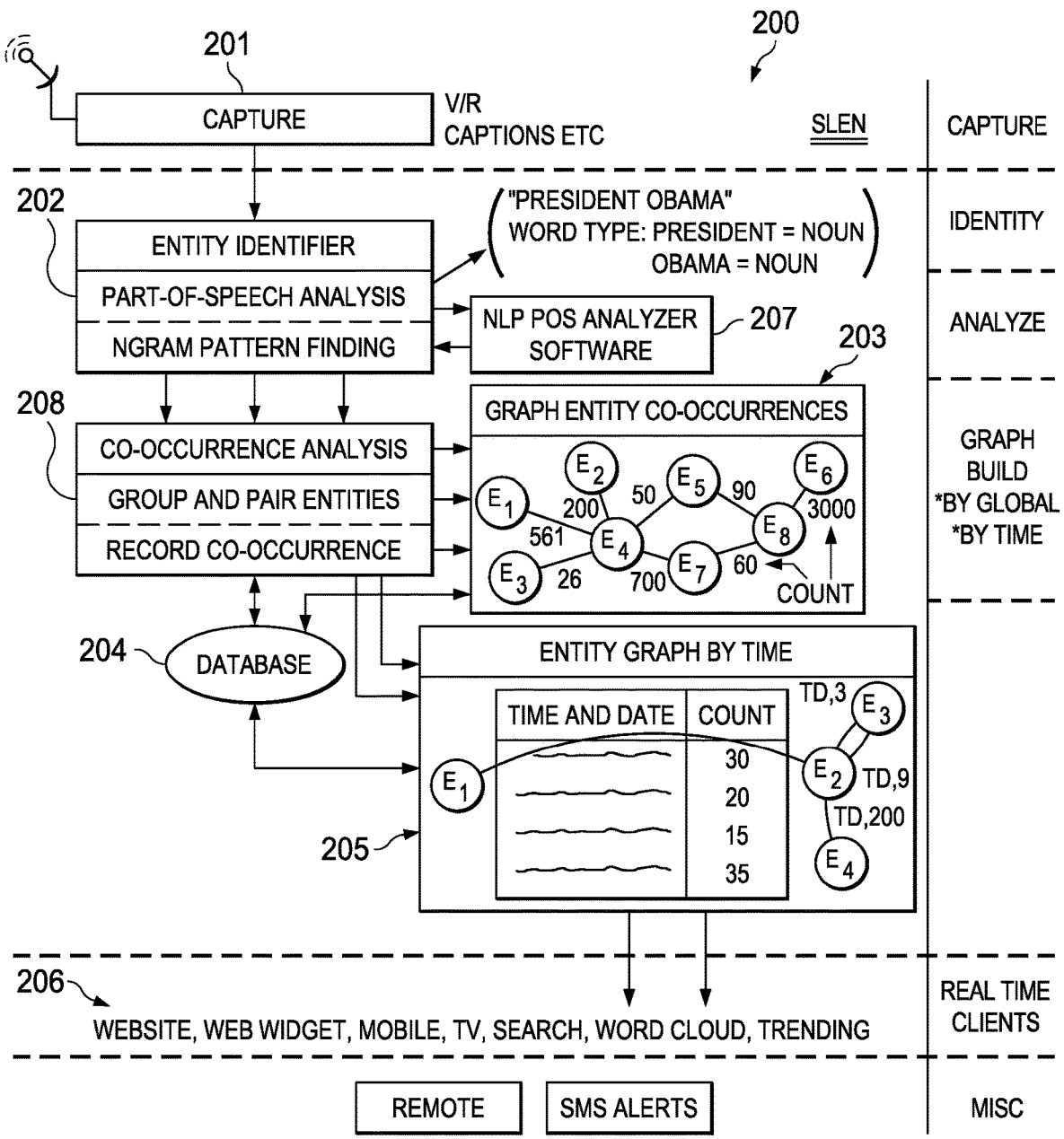
FIG. 2 illustrates an example embodiment of a Self-Learning Entity Network (SLEN) system that generates an entity network graph.

The system 100 is closely related to the SLEN system. FIG. 2 is an embodiment of the SLEN system 200. In an embodiment, the SLEN system 200 shares a number of components with the system 100. Furthermore, components of the SLEN system 200 may provide similar functionalities as some of the components of the system 100 because they are relatedly employed by various Boxfish technologies. In another embodiment, the SLEN system 200 may be a sub-system of the system 100 or of a system larger than the system 100.

I. DATA FLOW

An embodiment of the SLEN system 200 is operable to recognize entities, further determining whether an entity is a person, place, or a thing. The SLEN system 200 overcomes a previously unrecognized challenge by recognizing new names on TV involving people who have not been previously mentioned. And this ability feeds into a search engine, trending engine, and infrastructure of a Boxfish Platform.

The SLEN system 200 is thus designed to learn what it hears on TV. It "listens" to conversations on TV and extracts entities or meaningful people, places, objects, and things of that nature from massive volume of data that flows through the TV. The data is processed in real-time, flowing from a data source (not shown) to the client applications 205. Data flow can be generally divided into the following stages:

A. Capture

In an embodiment, data from the data source is captured and processed to generate a stream of text representing the words being spoken. In an embodiment, the Capturing Platform 201 performs this task. The data source may be a broadcast, cable, or IP-driven TV. The words may be supplied as a subtitle/caption stream or be decoded from the incoming broadcast using voice recognition. Outputs of the capture process include text phrases and their related time codes and channel sources. In an embodiment, the Capturing Platform 201 performs substantially the same as the Capturing Platform 101 of the system 100.

B. Processing

In an embodiment, the captured data is processed, wherein processing further involves entity recognition, normalization, and categorization. In another embodiment, the processing may further involve augmentation.

1. Entity Recognition

An embodiment of the SLEN system 200 identifies entities in a sentence to determine which parts of a sentence are important. For example, the SLEN system 200 is operable to identify the main subjects in the sentence. In an embodiment, the entities are determined by an Entity Identifier 202. FIG. 2 illustrates that an embodiment of the SLEN system 200 employs the Entity Identifier 202. The Entity Identifier 202 may employ various statistical Natural-Language Processing probabilistic models to perform Part-Of-Speech (POS) tagging, which allows the SLEN system 200 to identify the important parts of a sentence. The POS tagging receives the sentence, analyzes it, and determines the type of each word (word type) in the sentence. Thus, it determines whether each word is a noun, adjective, adverb, verb, singular, plural, etc. In an embodiment, the Entity Identifier 202 may further employ a Natural-Language Processing software 207 to perform this task.

An embodiment of the SLEN system 200 then performs a second phase of analysis where it identifies important patterns of word types in order to determine N-grams. For example, "President Obama" has the word types "Noun Noun." At this stage the identified word patterns probably correspond to N-grams and entities in the sentence. Generally, nouns in a sentence are recognized as entities. For example, in a sentence "Barack Obama was in London today," words "Barack," "Obama," "Barack Obama," and "London," are recognized as entities. In another embodiment, the Entity Identifier 202 may work substantially similar to the Entity Extractor 102.

However, the identified entities may be false positives, which are entities that appear to be meaningful, but are not. An embodiment of the SLEN system 200 thus determines whether entities are proper entities by tracking how often each entity appears across all conversations captured from the incoming streams. An entity that is often found has a very high probability of being a proper entity, while an entity that is rarely identified has a lower probability of being a proper entity. This phase of analysis extracts all the entities from a block of text, such as a sentence, paragraph, or TV program. Then it pairs each entity with all other entities in the block of text, i.e. "President Obama" was mentioned with "White House," "Mitt Romney," and/or "Michelle Obama." "Mitt Romney" was mentioned with "White House," "Obama," etc. Pairing can be overlapping or non-overlapping, e.g., the three words "President Barack Obama" can form the overlapping entities "President Barack," "Barack Obama," and "President," or they can form a single non-overlapping entity "President Barack Obama."

2. Normalization

Dictionaries provide keys and aliases for common entity representations. In an embodiment, a number of dictionaries are present in a Contextual Database. Online resources are often used to generate dictionary content. Thus, dictionaries may provide keys and/or aliases specifying that, for example, "Barack Obama," "President Obama," and "President of the United States" all refer to the same entity. An embodiment of the SLEN system 200 detects these key phrases and normalizes them to a common representation. For the aforementioned examples, the key phrases would be normalized to "Barack Obama."

3. Categorization

In an embodiment, dictionary representations also attach topic context when known to help determine ontologies of the discovered entities. An example would be "Barack Obama" being a politician, and more basically a person, and "London" being a city in Europe, and more generally being a location.

II. ENTITY RELATIONING

As shown in FIG. 2, a final phase of the analysis builds a large entity network graph 203 demonstrating entity relationships. The entity network graph 203 is continuously updated in real-time as new sentences are captured by the Capture Platform 201. A database 204 stores a frequency count of how often two entities co-occur (occur in a same block of text) in order to construct the entity network graph 203. In an embodiment, this is performed by a co-occurrence analysis component 208. In an embodiment, the co-occurrence analysis component 208 may group and pair entities, and further record co-occurrences. A frequency count gets updated when two entities co-occur. This produces a large graph showing how entities are connected to each other in numerous ways. In an embodiment, the SLEN system 200 comprises an entity graph by time 205 that is maintained by keeping track of the counts by time and date. Thus, in an embodiment, the entity graph by time 205 accesses the database 204 to perform entity relationing. In another embodiment, the SLEN system may construct other suitable graphs using techniques such as Latent-Semantic Indexing and Term-Frequency Inverse Document Frequency (TF-IDF).

For example, "President Obama" is connected to "Mitt Romney" who is strongly connected to "Ann Romney." "President Obama" is also strongly connected to "White House," "President," and many other entities. By continually updating in real-time the entity network graph 203 that shows co-occurrences of different entities, the embodiment of the system learns which entities co-occur and how they are related to each other.

The client applications 206 may be a web site, web widget, mobile, TV, Facebook, Twitter, or other suitable applications and devices employed by a client. For the purposes of the client, the collection of categories and trends are simplified to a set of categories, defined according to consumer/product interests, such as news, celebrities, politics, sports, etc.

III. PROCESS OUTPUT

In an embodiment, a set of entities with associated timecodes, channel sources, and topics are output. For example,

```
Entities:
[
  {
    key: "obama",
    type: "person",
    topic: "politics"
  },
  {
    key: "london",
    type: "location"
  },
]
```

IV. TRENDING

In an embodiment, the SLEN system 200 may be connected to the trending engine 103 of the system 100, which uses historic frequency metrics to calculate and quantify what phrases are being mentioned more frequently than usual. In another embodiment, the SLEN system 200 may itself include a substantially similar trending engine. In an embodiment, trending is performed not simply with historic frequency metrics, but by using other variables and data. In an embodiment, the SLEN system 200 may provide trending functionalities by accessing its entity graph by time 205 or its large entity network graph 203 that demonstrates entity relationships. A percentage increase or decrease of mentions may be balanced against the actual volume of mentions and the spread across the channels in order to produce a score that indicates how 'hot' a topic is. These values are constantly calculated for each word and stored in the trends database 106 or other suitable trending tables. Other embodiments of the trending engine 103 determines trending topics based on other relevant data.

These trending results are calculated and stored as 'system wide' trending results as well as in separate category groups. Thus, as shown in FIG. 1, the system 100 can determine:
a. What is trending overall on TV
b. What is trending in a particular region—such as UK or US
c. What is trending within a particular topic group—for example trending in 'politics' or 'sports'
d. What is trending on a particular data source—such as a TV channel.

In an embodiment, these trending functionalities can be performed by the SLEN system 200 that analyzes the entity network graph 203.

V. LIVE QUEUE BROKER

The primary purpose of this stage of processing is to take global trends and to filter them down to specific data points that client applications are interested in. For example, users may have the Boxfish Live page open with a query for "Kim Kardashian" and/or other celebrities. In an embodiment, the live queue broker 104 routes relevant mentions of these queries to the client applications 105. Trends that are not being actively followed can be ignored at this stage of processing.

The second purpose of this stage is to algorithmically control the rate at which these notifications are delivered. For example, "Barack Obama" may be mentioned 3,000 times on TV in a day, but it would be inconvenient to send 3,000 alerts for each user on a daily basis. Thus, the present embodiment determines which mentions are significant based on how the phrase is trending overall. This allows a user to know whether a story is significant or "breaking." These calculations also take into account an overall "throttle" so that even if a client is interested in several topics, the client is not bombarded with mentions.

In an embodiment, once items are found to have met a desired threshold, the items are routed to the client application 105. This is dependent on the client's technology, but in described embodiments the routing is via a real-time "push," rather than by a polling process. The live queue broker may be connected to or be a part of the SLEN system 200.

VI. EXEMPLARY APPLICATIONS

In an embodiment, it may be desirable to see how often "Obama" is mentioned over time. The present embodiment identifies what words frequently occur with "Obama" (e.g., words that are strongly related to "Obama") and then determines that "Obama" can refer to "President Obama," "Barack Obama," etc. Thus, this information may be used for determining normalization.

An embodiment of the SLEN system 200 improves the accuracy of the trending models created by the system. It also generates the system's transcripts that are displayed. In an embodiment, certain entities are "clickable," so that a user can click on an entity and have access to more information on the entity. For example, if "President Obama" is clicked, the same information would display as if "Obama," "Barack Obama," etc. had been clicked.

Another example is if the word "Apple" is used, the system uses related entries to determine if the "Apple" being referred to is Apple (the company) or apple (the fruit).

Another example is when a user performs a search; the system rewrites the search to incorporate more information than would otherwise appear. For example, if a user searches "Obama," the system references it against the data graphs involving the word "Obama," then looks for words with a strong correlation to "Obama," such as "White House" and "President."

VII. AD RECOGNITION

Figure 3:
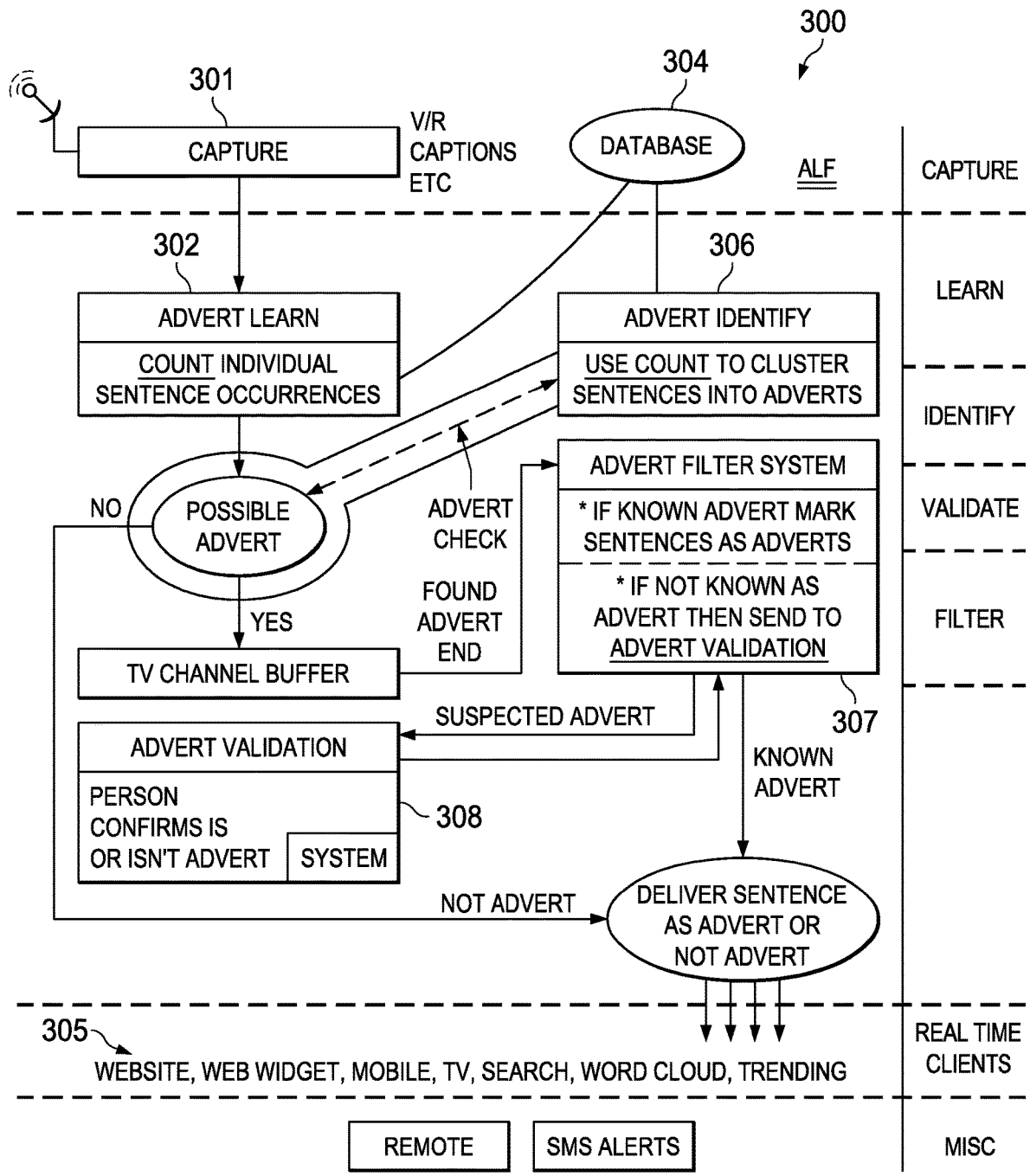
FIG. 3 illustrates an example embodiment of an advertisement recognition system.

It may be desirable for the system to be able to identify advertisements (ads) to ensure that a user's search does not result in ad content. For example, if a user searches for "Coke," the search would likely result in many Coca Cola ads. FIG. 3 illustrates an embodiment of an ad recognition system 300 that organizes and identifies ads that run on TV and other data sources so that such ad content can be filtered in a user's search. A Capture Platform 301 captures data from data sources. The ad recognition system 300 may be connected to the SLEN system 200. In an embodiment, the ad recognition system 300 comprises a database 304 to store the recognized ad information. The ad learn component 302 may learn ads by counting individual sentence occurences. In an embodiment, the ad learn component 302 may further be connected to an ad identifier 306 that uses the count to cluster sentences into adverts. It may further check for adverts. If it is deemed a possible advert, an advert filter system 307 may filter the ad. The advert filter system may further be connected to an advert validation component 308 where a user may confirm whether a recognized data is an ad or not. The ad recognition system 300 may deliver the captured sentence as an advert or not an advert to the user. In an embodiment, the ad is referred to as the advert.

The ad recognition ability can also be useful in reverse—if a user wants to know whether something is mentioned in an ad (e.g. competitors in business or the user's trademark brand), a configured search can identify ad content. The client applications 305 may be a web site, web widget, mobile, TV, Facebook, Twitter, or other suitable applications and devices employed by a client.

An exemplary ad recognition system 300 can take incoming streams and learn what the ads are. An administrator (admin) may help recognize flagged ad content. The admin may be a person. Basically, the admin can determine if the system is correctly guessing what is and is not an ad. The system is configured to enable the admin to confirm or reject whether a clipped section is an ad or not. If it is an ad, the system files it as an ad and references future ads against that file when determining what is an ad.

Thus, in an embodiment, the system 300 keeps track of how often a sentence occurs. In normal transcription, most sentences do not occur that often. In an advertisement, however, the same sentence will usually be played at least several times a day on several networks. Each time a sentence is said on a given network, the system 300 may check to see how many times that sentence has been said. If it has been said a lot, for example ten times, the system then checks the next sentence to see if it matches a similar pattern. If it does, the system 300 continues to monitor these sentences. Eventually the system 300 will have stored a database of sentences presumed to be parts of an ad. Once the system identifies an ad, it begins to look for the end of the ad. If a subsequent sentence has been mentioned only three times, then the system 300 can reasonably assume that this is the end of the ad. For example, if an ad is seven sentences long, the system looks at the immediately subsequent sentence in order to determine whether that sentence is or is not part of the ad. The system can use this data in conjunction with timing (i.e., most ads are approximately 30 seconds long) to also determine what phrases are a part of given ads and where ad programming vs. regular programming is occurring.

In an embodiment, the system 300 then passes this information to the admin to verify whether it has indeed identified an ad. If it is an ad, the system stores that data in a data file, which it can later refer back to when determining whether or not something is an ad. In an embodiment, the data files are stored in a database 304.

In an embodiment, the system 300 is also capable of identifying "catch phrases" in ads. For example, Cingular Wireless uses the "Can you hear me now?" line in its ads. The system can recognize that this is a phrase frequently used in ad, possibly even in a particular part of an ad, and can use that to aid in ad identification.

Figure 15A:
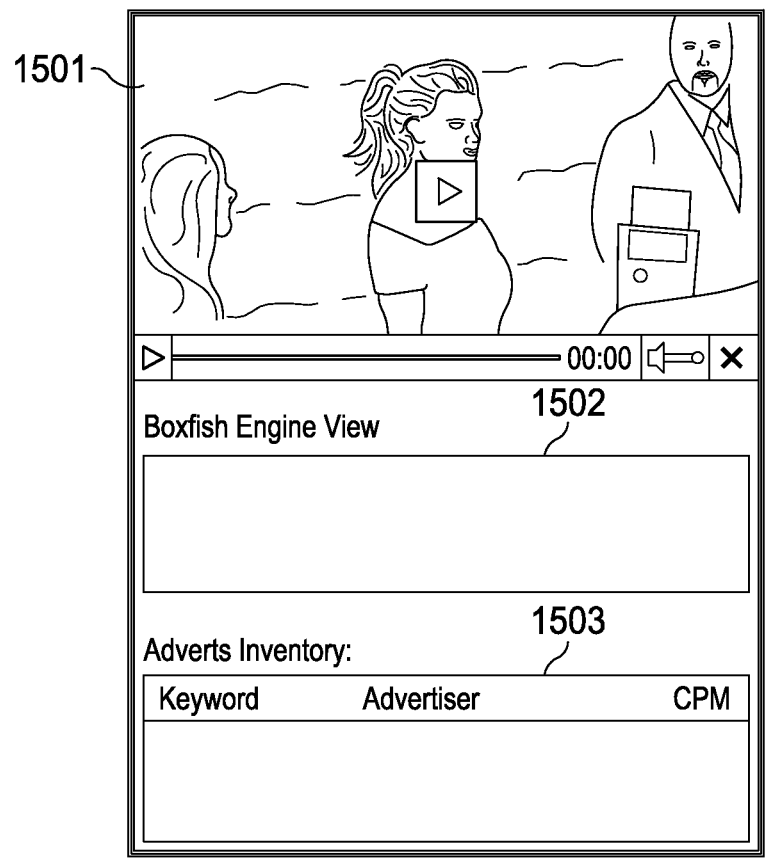
FIGS. 15A-15B illustrate example embodiments of a TV screen or website employing the Boxfish technology on advert exchange marketplace.
Figure 15B:
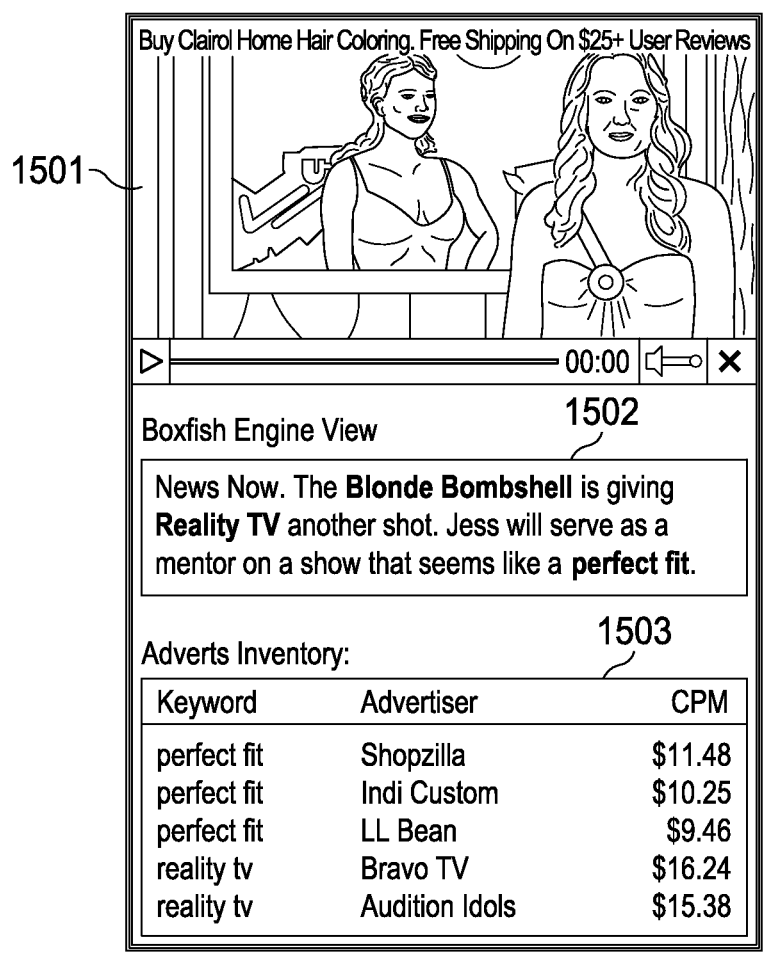

FIG. 15A-15B illustrate an embodiment of the Boxfish technology where words on TV are used as keys to an advert exchange marketplace. Top value keywords deliver an ad to the video header. The embodiment has a screen 1501 where a program or a show is played. While the show is being played, Boxfish Engine View 1502 captures and displays what is being said on the show. Then keywords, topics, or entities are identified or extracted in the Boxfish Engine View 1502 according embodiments specified in this disclosure. Adverts Inventory 1503 generates a list of advertisers and "costs per minute" or "CPM" (or more generally, any indicator of ad value/cost) for each of the keywords.

Figure 10:
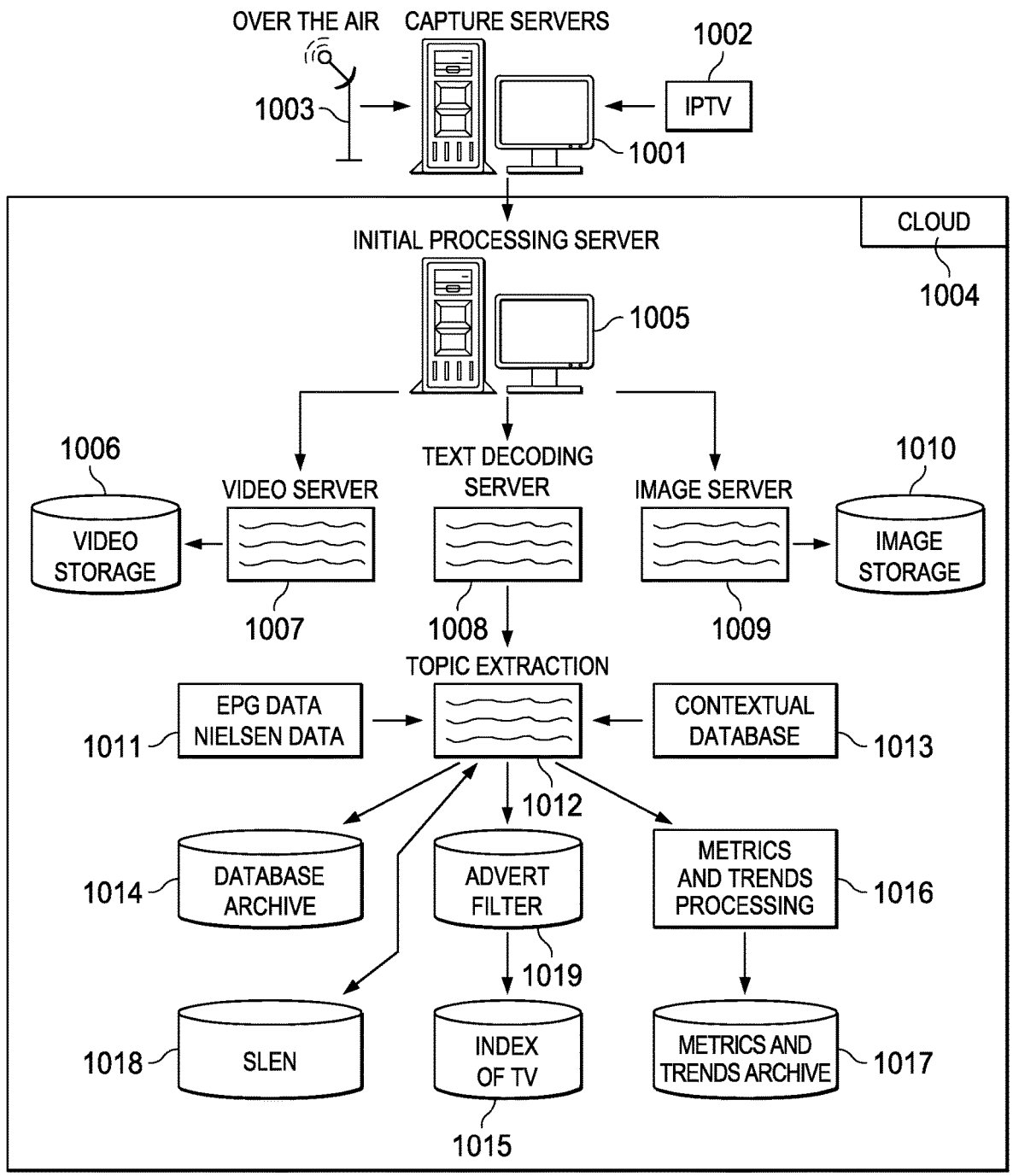
FIG. 10 illustrates an example configuration employing the SLEN system and the advertisement recognition system.

As mentioned, the system for implementing SLEN can be understood in terms of a processing engine, Capture Platform, and other system elements previously described. FIG. 3 provides an illustrated view of the ad recognition system as applied in the description of this application and in accordance with the other figures herein. FIG. 10 illustrates how the SLEN and ad recognition technology can be implemented in the current system. The system comprises Capture Servers 1001, an Initial Processing Server 1005, a Video Server 1007, a Video Storage 1006, a Text Decoding Server 1008, an Image Server 1009, an Image Storage 1010, a Topic Extraction 1012, a Contextual Database 1013, a Database Archive 1014, a Metrics and Trends Processing 1016, a Metrics and Trends Archive 1017, an Index of TV 1015, a SLEN 1018, and an Ad Filter 1019. In an embodiment, the Capture Servers 1001 may capture data with an antenna or through other means from over the air 1003. IPTV 1002 may be fed into the Capture Servers 1001 as input.

VIII. REAL-TIME CLIENTS

Figure 8:
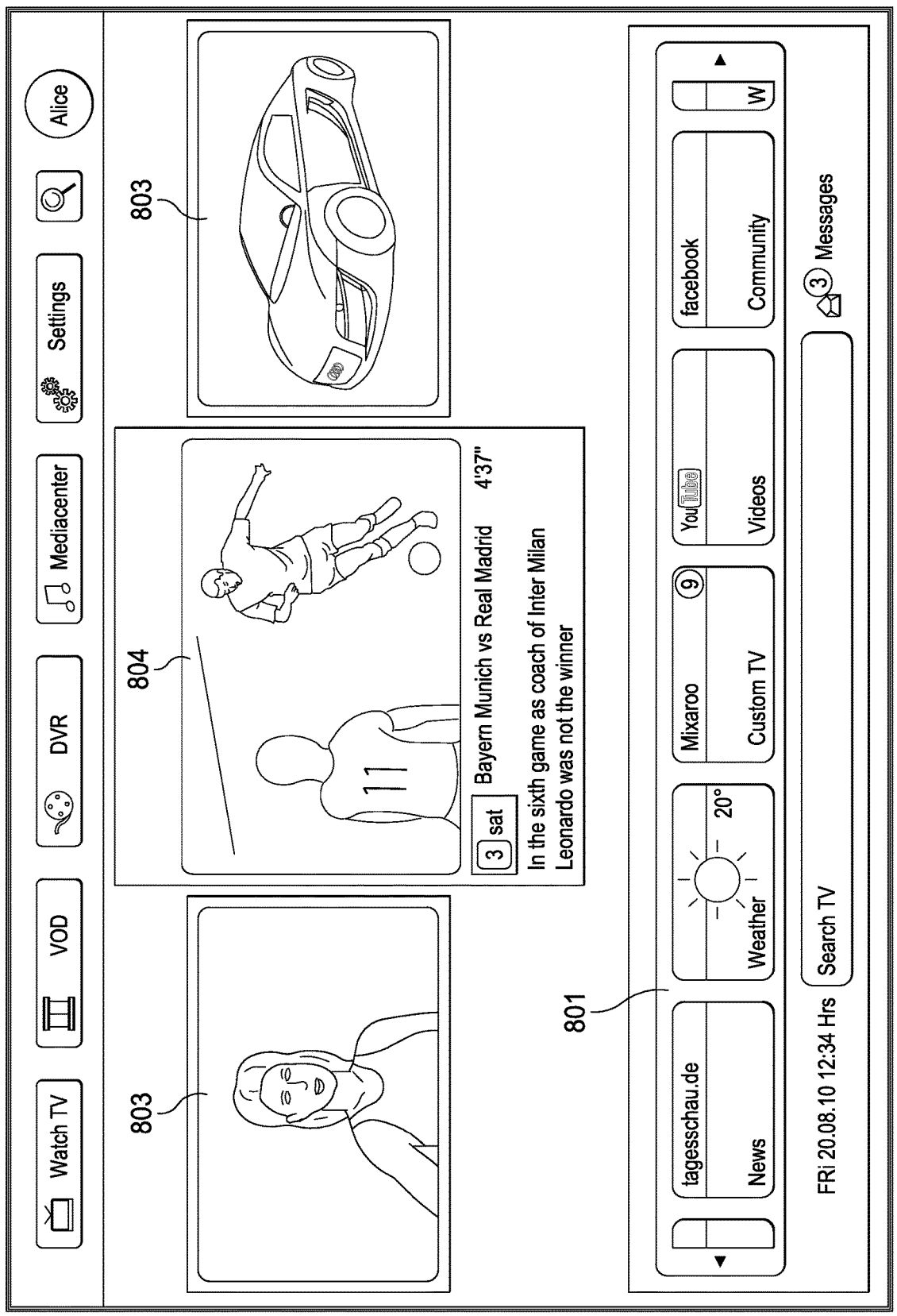
FIG. 8 illustrates an example of an IPTV client.
Figure 9:
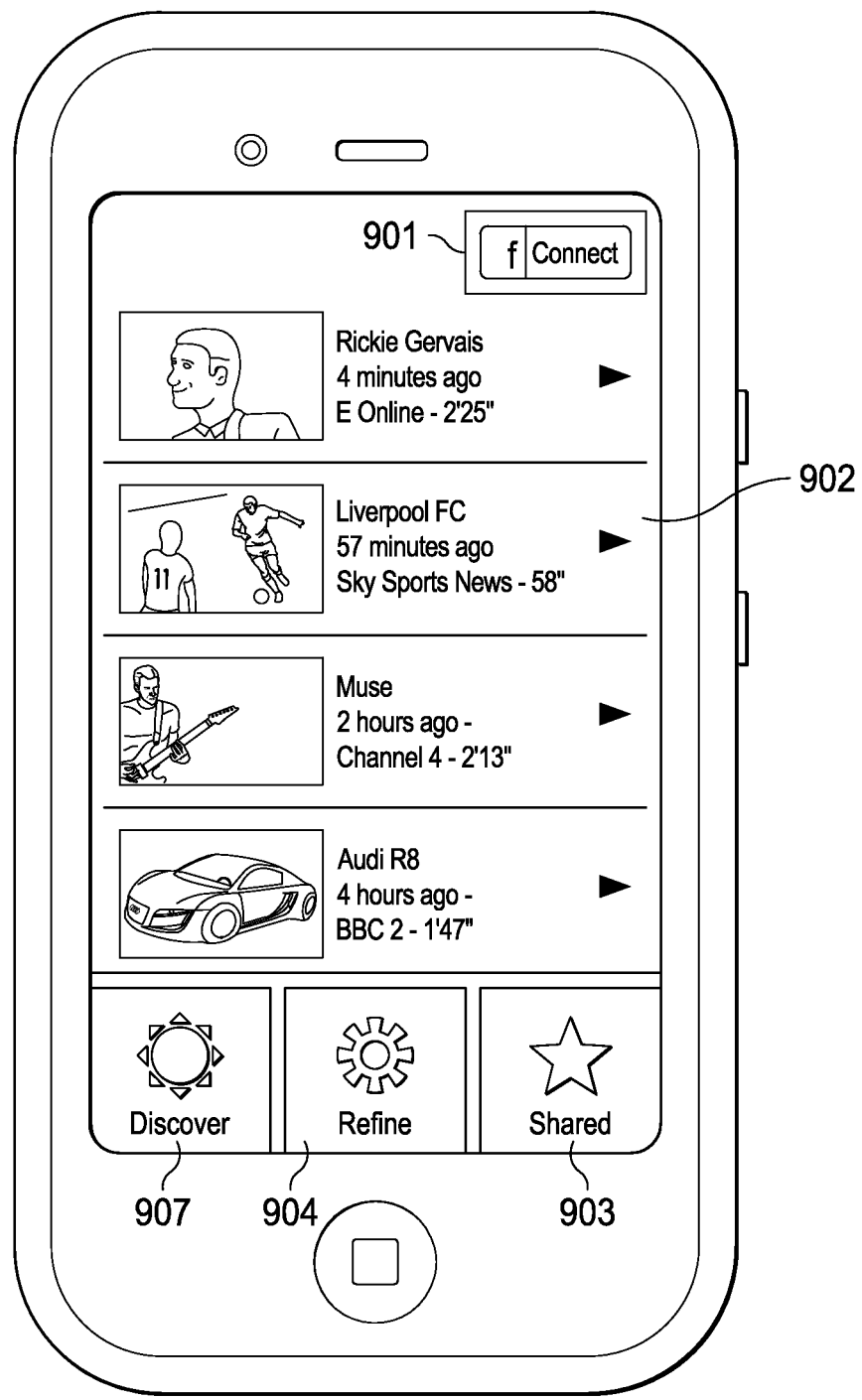
FIG. 9 illustrates an example of a mobile device client.

Multiple platforms can serve as clients to receive trending items. FIG. 7 illustrates an example of a web client interface and its functional components. This interface demonstrates the use of a number of platform elements, such as trending topics 701, custom video queue 702, shared 703, video player 704, transcript 705, and search box 706. Trending topics 701 may be delivered from a Trending Topics engine. The small 'pin' icon next to the 'Trending' title 701 text in this example is described as a location pin. This suggests that the results are local to a user, rather than being a 'global' trending topic. Custom video queue 702 is displayed as a series of thumbnails at the bottom of the page. This is customized to a logged-in user, so it would be replaced with a login button if no user is currently logged in. FIG. 8 illustrates an example of an IPTV client and its functional components. The IPTV {XE "IPTV"} interface example displays an "App" Selection 801 at the bottom of the page, and above that, the custom queue of video items to select from. The video thumbnails show the view after the user{XE "user"} has connected to their social account to configure their interests, or, like a web-based 'Discover 907' list (shown in FIG. 9), featured/top ranked items for users who are not connected. In an embodiment, a video player 804 is provided in the center. In an embodiment, shared 103 provides a queue format with a number of times an item has been shared in social networks such as Twitter, Facebook, and so forth. FIG. 9 illustrates an example of a mobile client. It displays a custom queue, along with the 'Discover 907' and 'Shared 903' buttons. The 'Connect' button 901 at the top of the example image enables the user{XE "user"} to connect using Facebook's Open Graph API{XE "API"} as a source for taste graph interests. A 'Refine 904' button at the center of the bottom tab panel is provided to lead to a list of taste graph interests that the user{XE "user"} can modify. In an embodiment, a Custom Video Queue 902 is provided, displaying as a thumbnail.

A. Web

Boxfish Live, as shown in FIG. 4, serves as an online example of the website interface. It serves as a place to view multiple trending topics online. In an embodiment, a list of trending topics is provided on a left column. In this embodiment, some of the trending topics are "draft," "obama," "romney," "apple," "secret service," etc. A keyword may be entered and searched in a box provided in the center of the website.

B. Mobile

Figure 5:
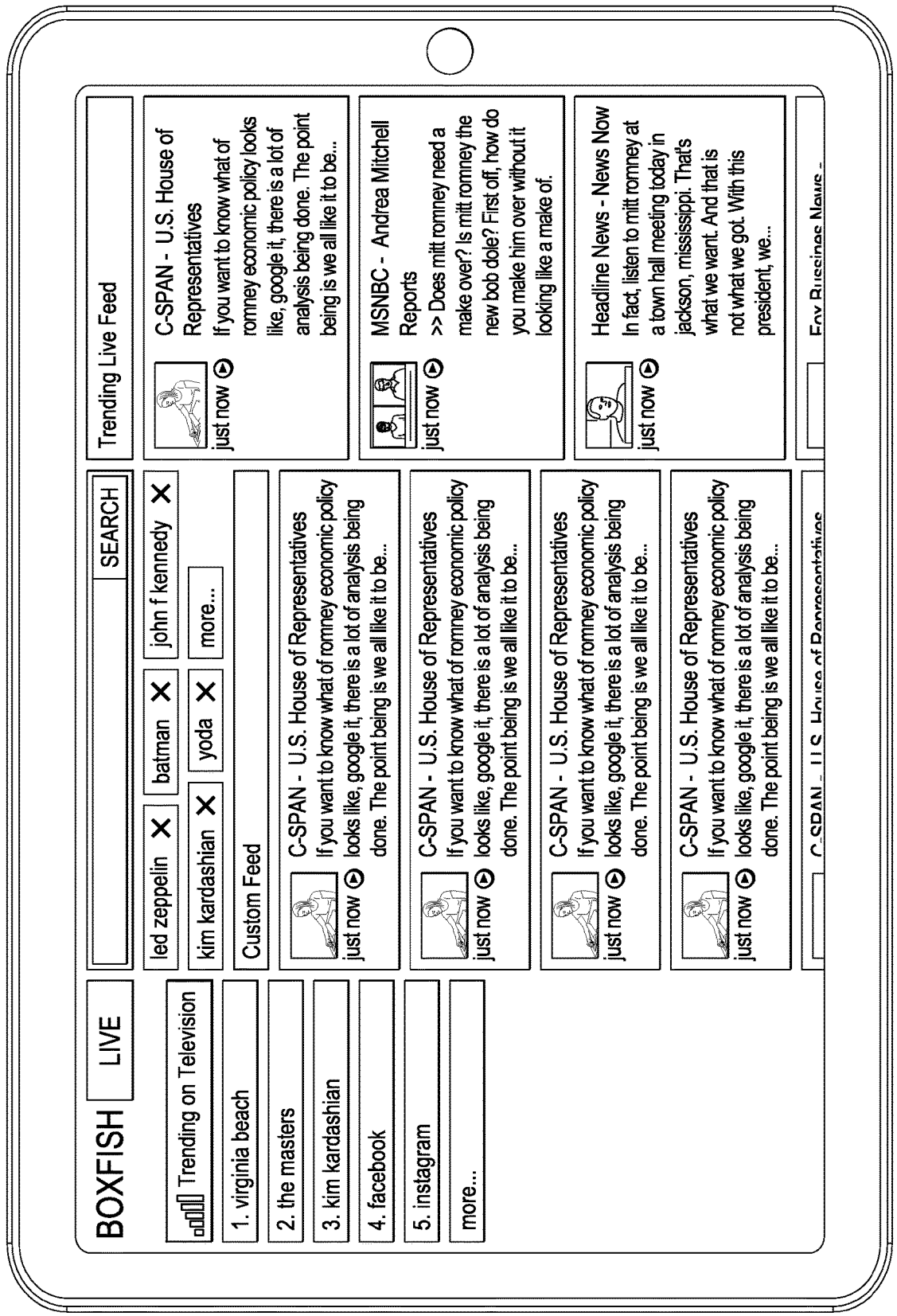
FIG. 5 illustrates an example of a mobile device implementation employing the SLEN system.
Figure 6:
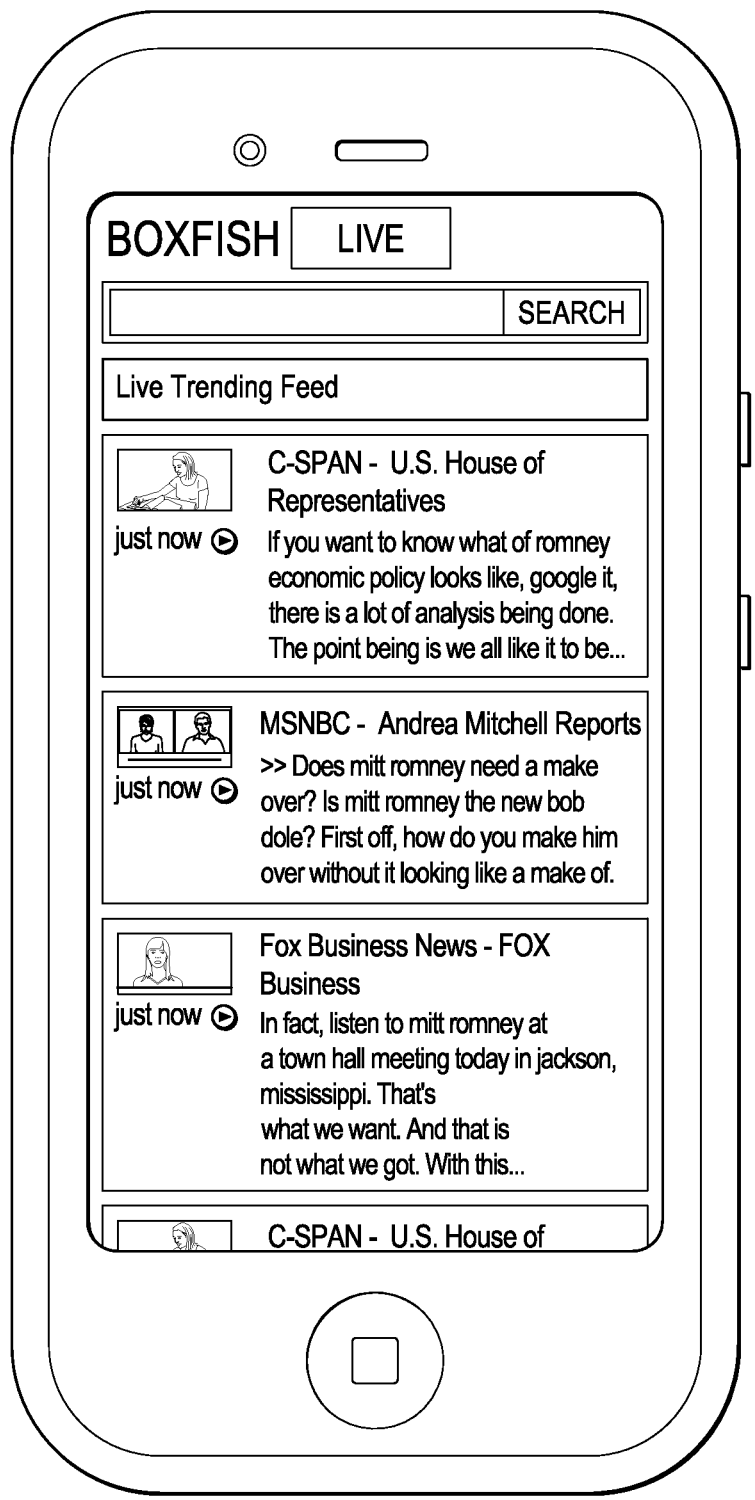
FIG. 6 illustrates another example of a mobile device implementation employing the SLEN system.
Figure 16A:
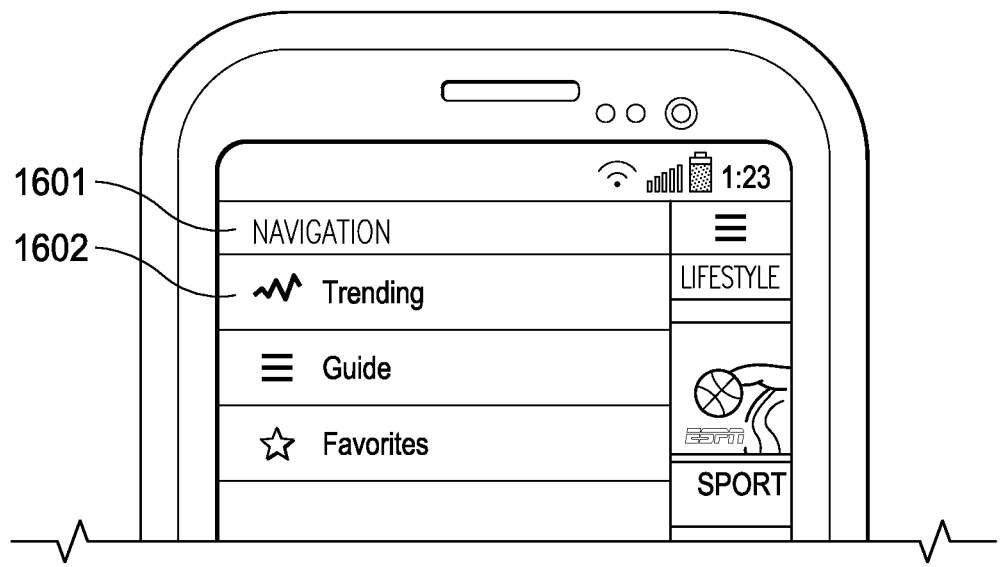
FIGS. 16A-16D illustrate embodiments of mobile device implementations employing the Boxfish technology.
Figure 16B:
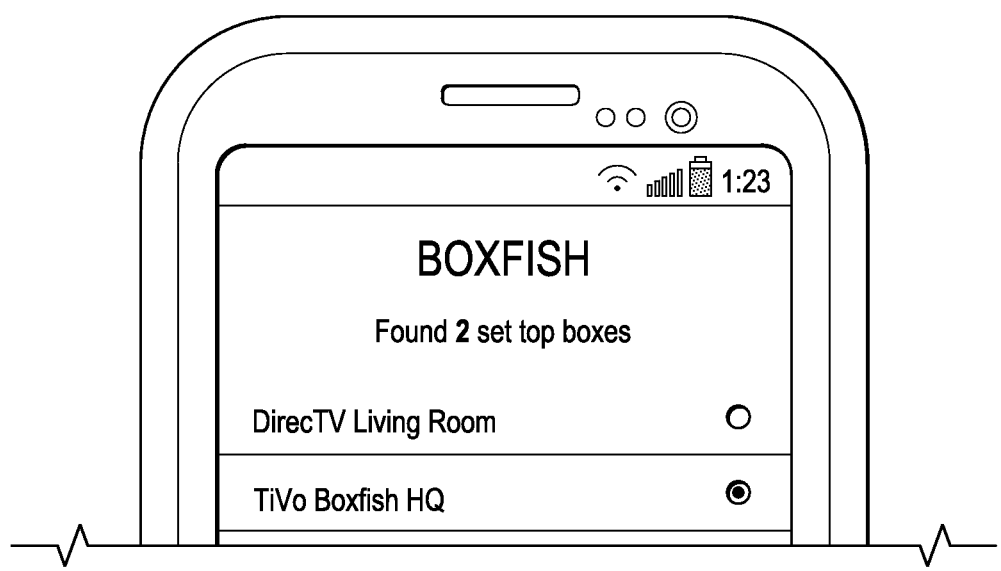
Figure 16C:
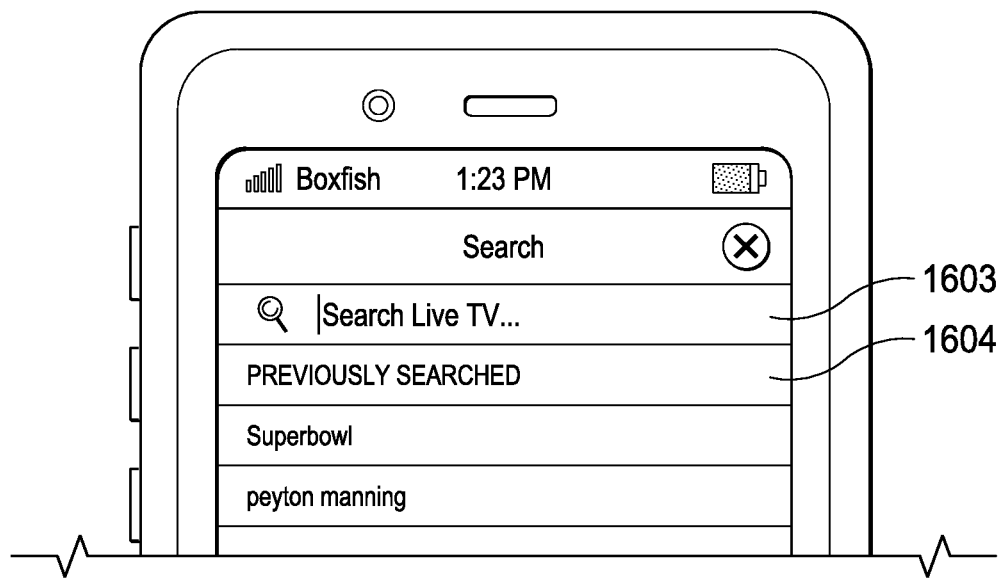
Figure 16D:
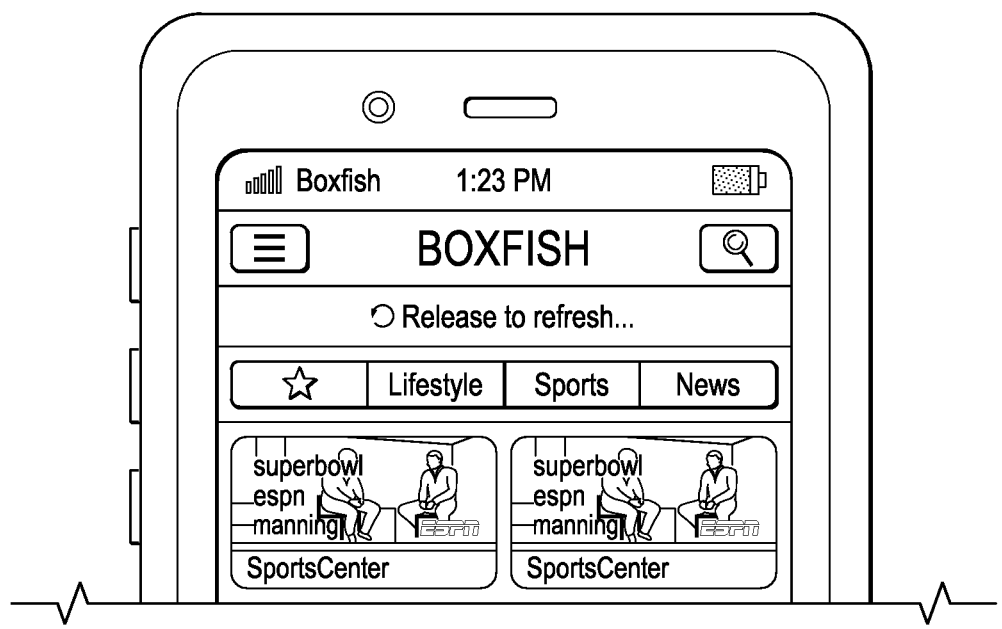

Mobile device implementations, illustrated in exemplary FIGS. 5-6, also provide an engaging client experience. Once again, trending topics are provided on the left, where some of the trending topics are "virginia beach," "the masters," "kim kardashian," "facebook," and "instagram" in this embodiment. Button "more . . . " can be clicked to list more trending topics. A keyword may be entered and searched for in a box provided on top. FIGS. 16A-16D illustrate embodiments of mobile device implementations that employ the Boxfish technology. FIG. 16A shows a Navigation Bar 1601, which further lists Trending 1602, Guide, and Favorites. The Trending 1602 may be selected to list trending keywords or terms. Other embodiments may have more options under Navigation such as Television Guide and Alerts. FIG. 16B illustrates a mobile device locating two set top boxes that it can be connected to. In this embodiment, the two set top boxes are DirecTV Living Room and TiVo Boxfish HQ. There may be more set top boxes in other embodiments. FIG. 16C illustrates a mobile device screen showing a search feature. The search feature will have a search box 1603 where a user can enter search terms. In this embodiment, a list of previously searched terms 1604 is provided under the search box 1603. FIG. 16D illustrates a screen of a mobile device refreshing the Boxfish application.

C. Television

Figure 11A:
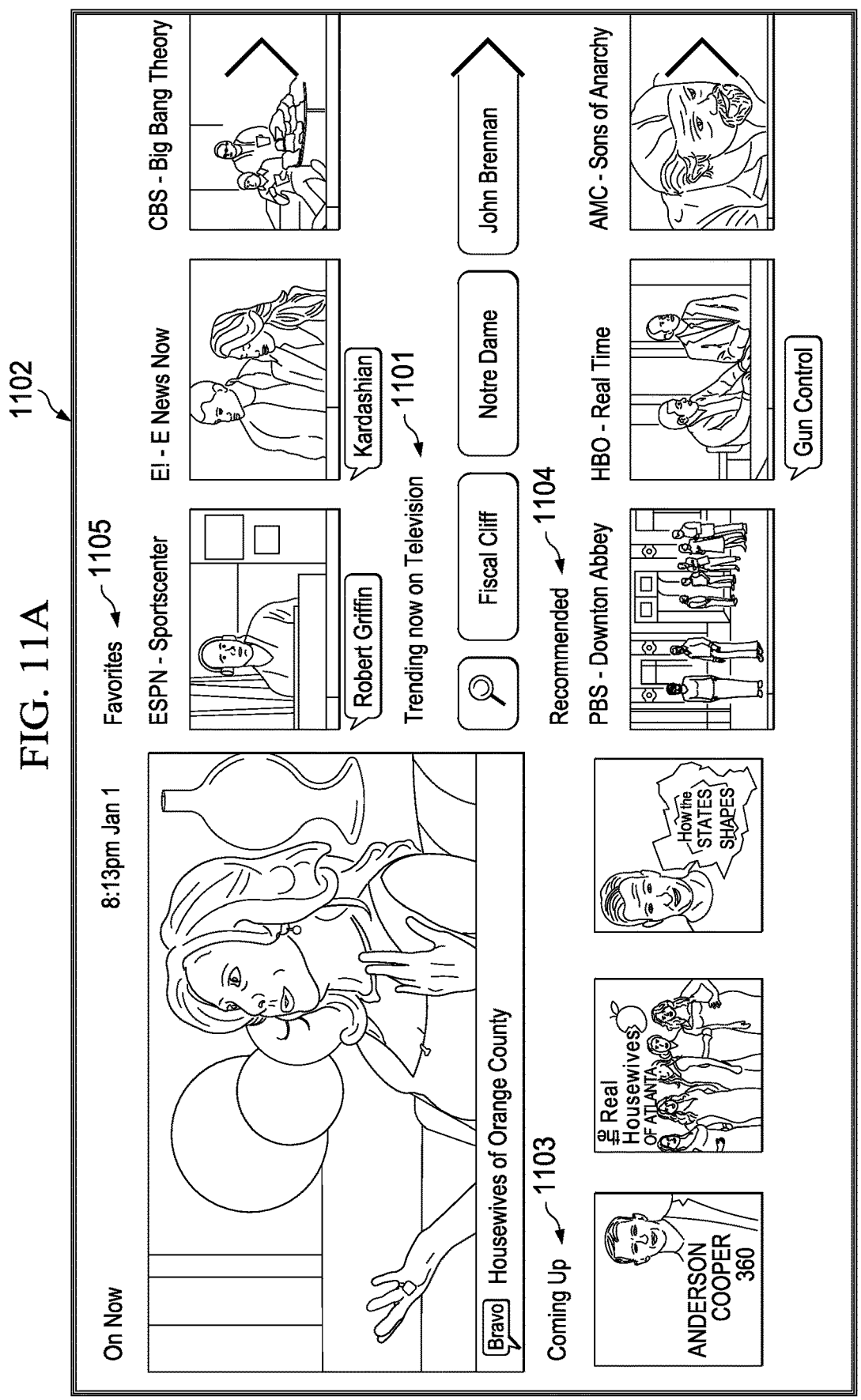
FIG. 11A illustrates an example of a TV home screen employing the Boxfish technology.
Figure 12A:
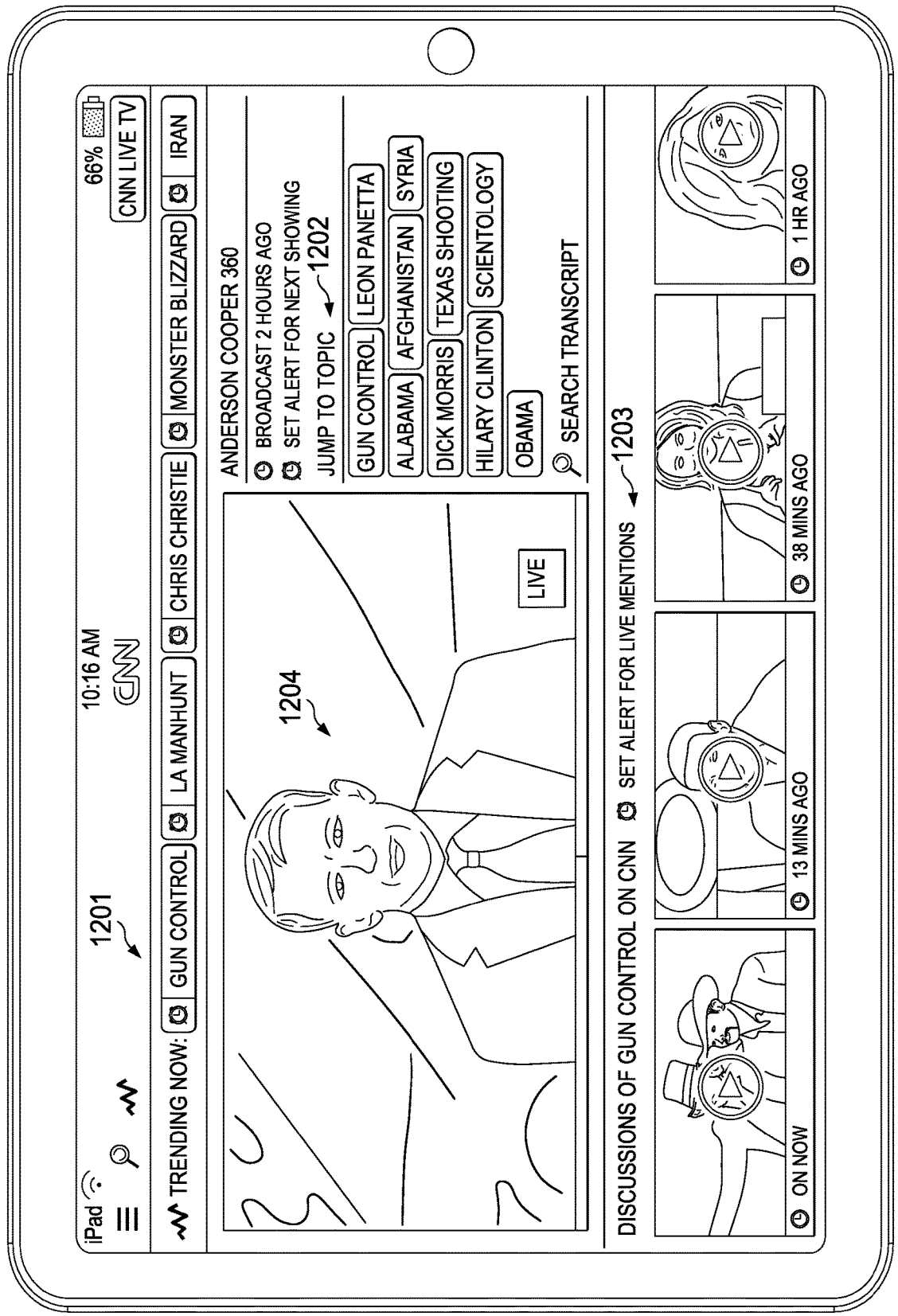
FIGS. 12A-12C illustrate embodiments of a partner application named CNN-expand model.
Figure 12B:
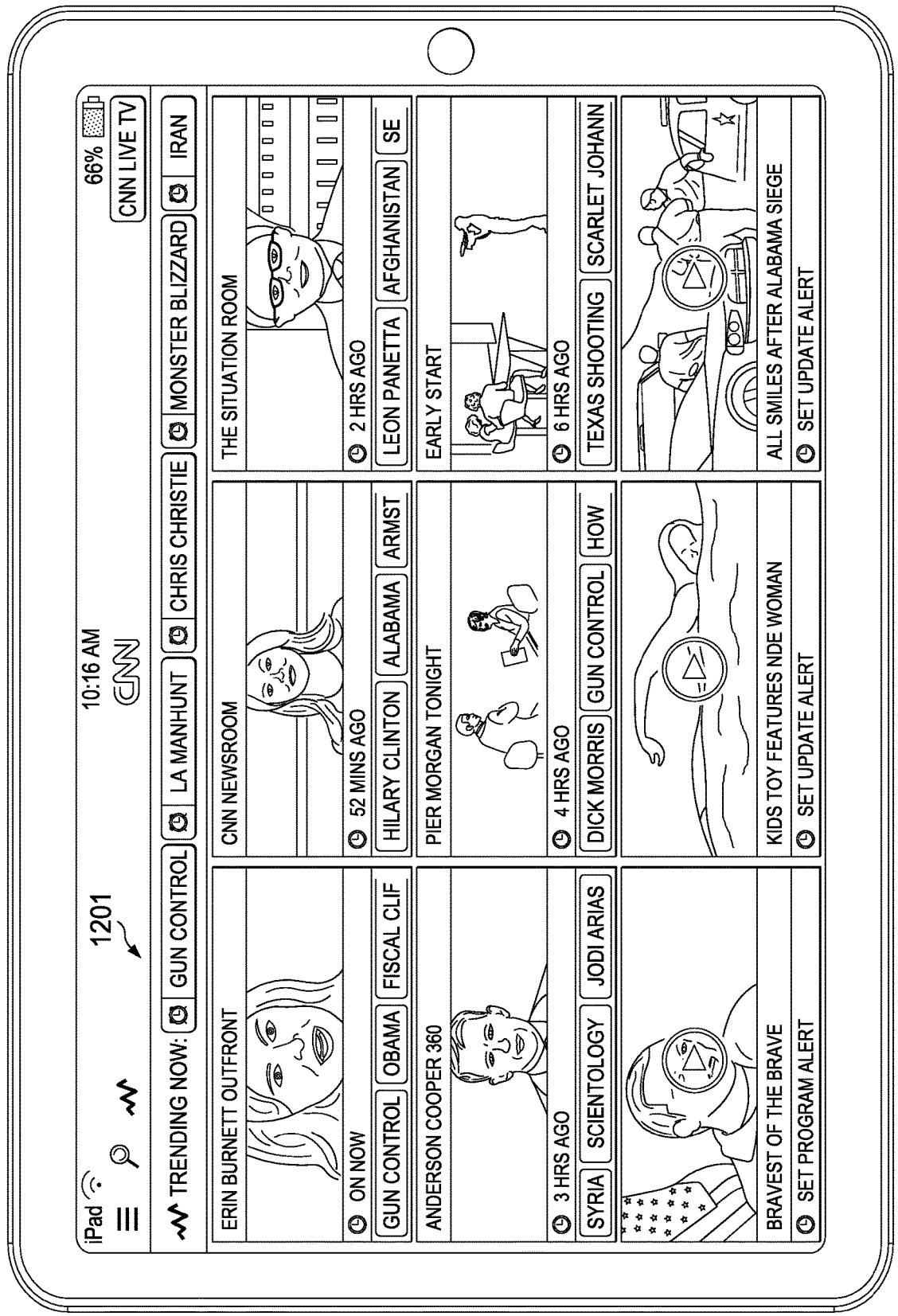
Figure 12C:
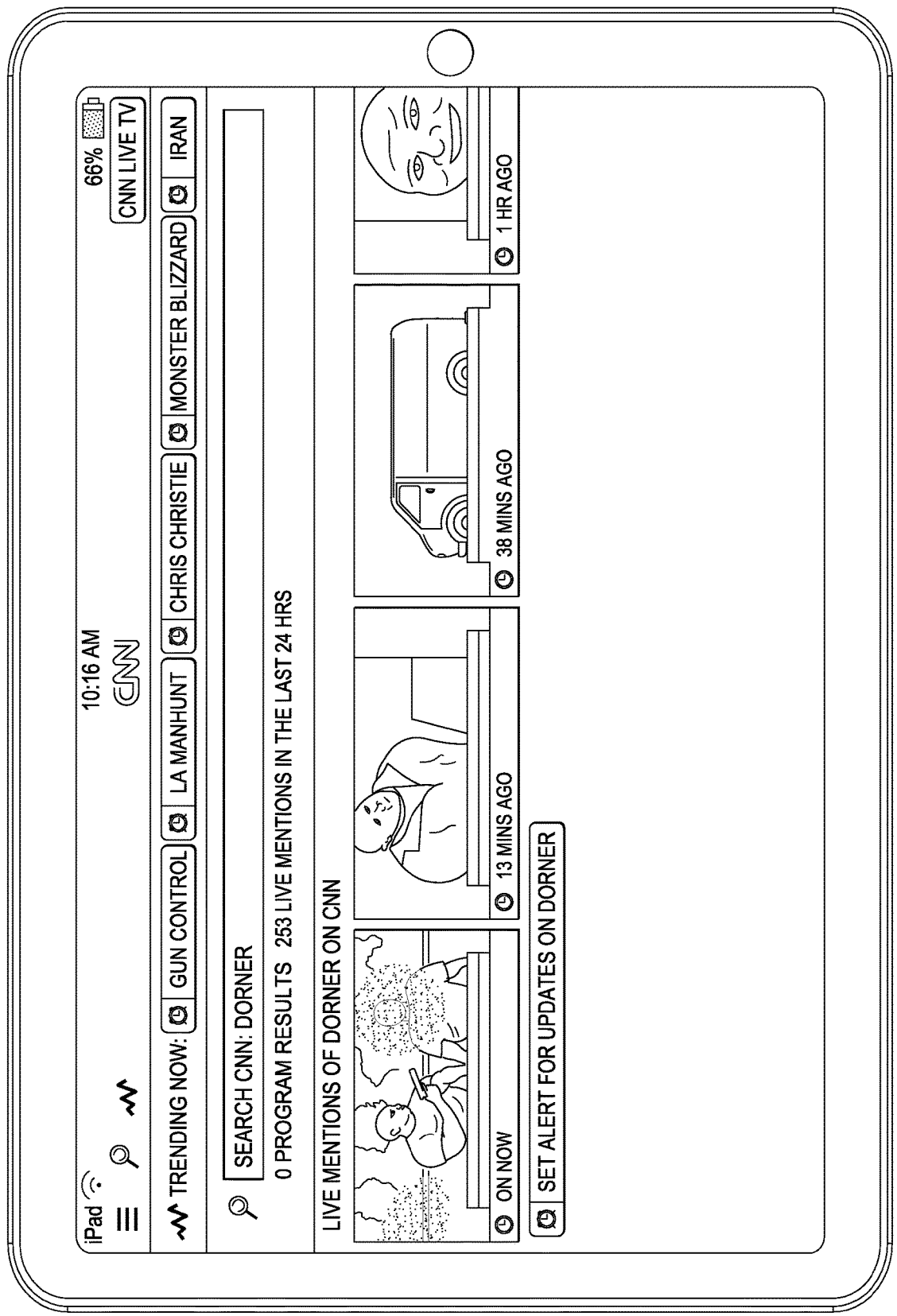

Multiple television manufacturers provide "smart TV" platforms that function using the aforementioned systems. In an exemplary smart TV system, an interface that has similar appearance to the Boxfish Live screen of FIG. 5 would appear on the smart TV interface/menu. FIG. 11A illustrates an example of a TV home screen that employs the Boxfish technology. Instead of opening on a last channel watched, this embodiment provides a screen with recommendations 1104 when opened. In an embodiment, an on-now screen 1102 displays a show currently selected and playing. The present embodiment also shows Favorites 1105 shows, Coming Up 1103 shows and infomercials, Recommended 1104 shows, and trends 1101. Other embodiments may display other information. The embodiment provides trending TV topics as trends 1101 and context for various shows that can be viewed on TV. FIG. 11B illustrates an autocomplete feature for a TV using the Boxfish technology. A related, partner application named "CNN-expand model" is similar to the aforementioned Boxfish technology. However, it places a new emphasis on topics. This is shown in FIG. 12A. The present embodiment of the CNN-expand model displays trending topics 1201, a currently playing show 1204, Jump to Topic 1202, and related discussions 1203. Pressing on a topic on the Jump to Topic 1202 list allows a user to view shows on that topic. FIG. 12B illustrates another embodiment of the CNN-expand model that allows a user to set program and story update alerts. FIG. 12C illustrates a search example of the CNN-expand model. Trending topics are provided on top next to "Trending Now." Keywords may be entered and searched for in a search box under "Trending Now." In this example, "Dorner" had been entered by the user. This search has returned 0 program results, but 253 live mentions in the last 24 hours. Live mentions of "Dorner" on CNN are listed below. Also, alerts may be set for updates on "Dorner" by clicking on the "SET ALERT FOR UPDATES ON DORNER" button at the bottom.

Figure 13:
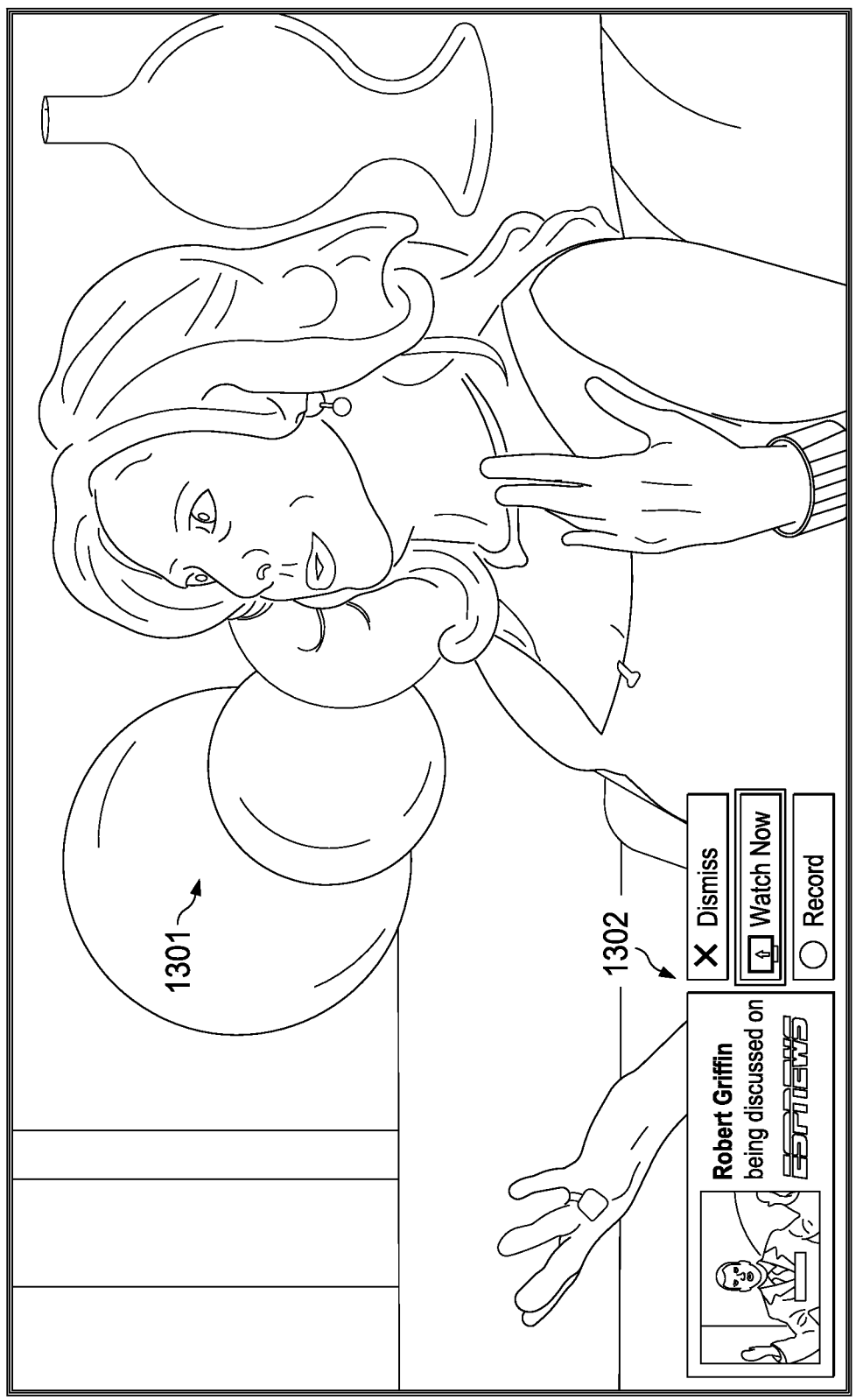
FIG. 13 illustrates an example embodiment of a TV screen employing the Boxfish technology.

FIG. 13 illustrates another embodiment of a TV screen that employs the Boxfish technology, where TV alerts 1302 are displayed at the bottom while a user is watching a show on a main screen 1301. In an embodiment, TV alerts 1302 are generated based on topics. Thus, while many of the described embodiments herein relate to interaction with a set-top box, such as a cable TV set-top box, the concepts described herein are equally applicable to televisions with built-in guide and tuning functionality, or with network-based or IPTV-based televisions.

Figure 14:
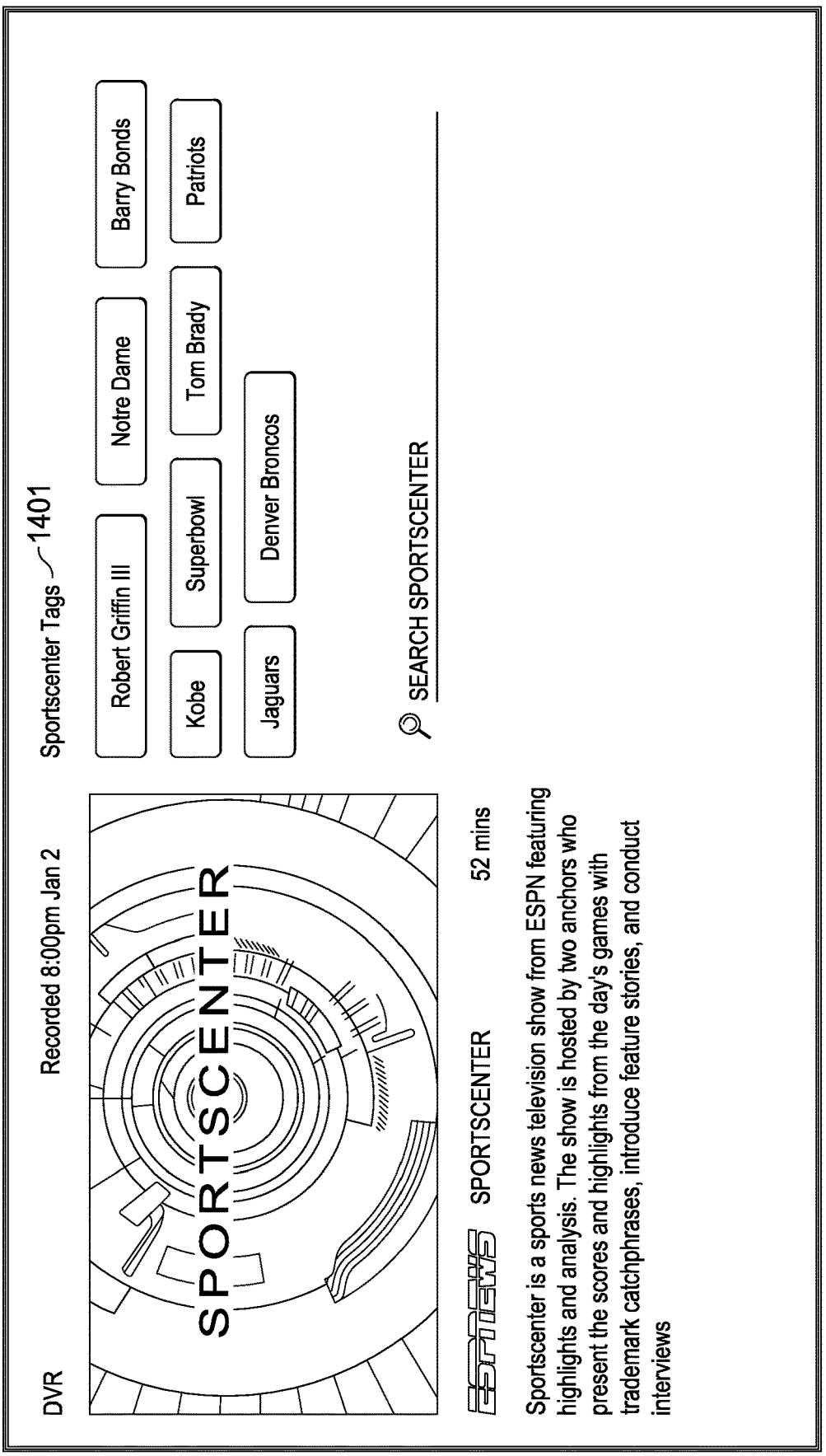
FIG. 14 illustrates an example embodiment of a DVR screen.

FIG. 14 illustrates an example DVR screen utilizing the Boxfish technology. In an embodiment, clicking on any of tags 1401 allows a user to view the show at a point where the topic is being mentioned. This embodiment thus addresses a problem with currently known DVR recordings in that it is difficult and time-consuming to find relevant content within the recording. Fast-forwarding through the content is tricky, and only effective if the viewer knows what is being displayed when the programming of interest comes up. The disclosed embodiment provides the ability to effectively locate topics in DVR recordings according to the content of discussion.

D. As a General Interest Data Source

In addition to the different client formats provided above, the stream of Boxfish data can be embedded in third party applications or social networks, displaying relevant content to visitors.

IX. SMART PHONE REMOTE APP

As a "second screen" device to a TV, these devices can be used to control the TV remote, acting as a content aware remote control. For example, as a live alert appears on the client displaying a mention for Kim Kardashian, "10 seconds ago," the user can select the mention to have their TV tune into the program containing the mention. These features can be incorporated into embodiments similar to that of the embodiments illustrated in FIGS. 16A-16D.

Further, remote or out-of-home users can initiate a 'record' functionality from their mobile device, initiating a recording on their home DVR.

Because much TV is repeated and/or time-shifted according to location, the platform can predict when relevant programming will appear and alert the client to watch or record a certain channel/program before it has aired or for the relevant portion for the programming.

SMS and email alerts may also provide short, context aware notifications of historic, live, or future showings of relevant content.

In other words, Boxfish remote concept functions as a content-aware remote. The app is able to detect when something following your search parameters is mentioned on a specific channel, and notifies the user with a request to change the channel. The remote control app functions can basically include the same input data as the Boxfish Live. It provides a user with a location of the last sentence on a topic the user is interested in. Thus, in an embodiment, the user can find the channel displaying that last sentence on her topic of interest. The user can locate and switch channels based on this information.

X. REAL-TIME TV MONITORING, TRACKING AND CONTROL SYSTEM

Various aspects of the remote control/user interface are further described in U.S. Provisional Patent Application No. 61/749,889, filed on Jan. 7, 2013 and entitled "Real-Time Television Monitoring, Tracking and Control System," which, including the Appendix thereto, is hereby incorporated by reference herein for such description, including how such functional elements are incorporated in the described system. Further placing the user interface elements in the context of the overall discussion of the system above, these elements are generally described below with respect to the their accompanying figures.

A. Tiled Channel View

Figure 17:
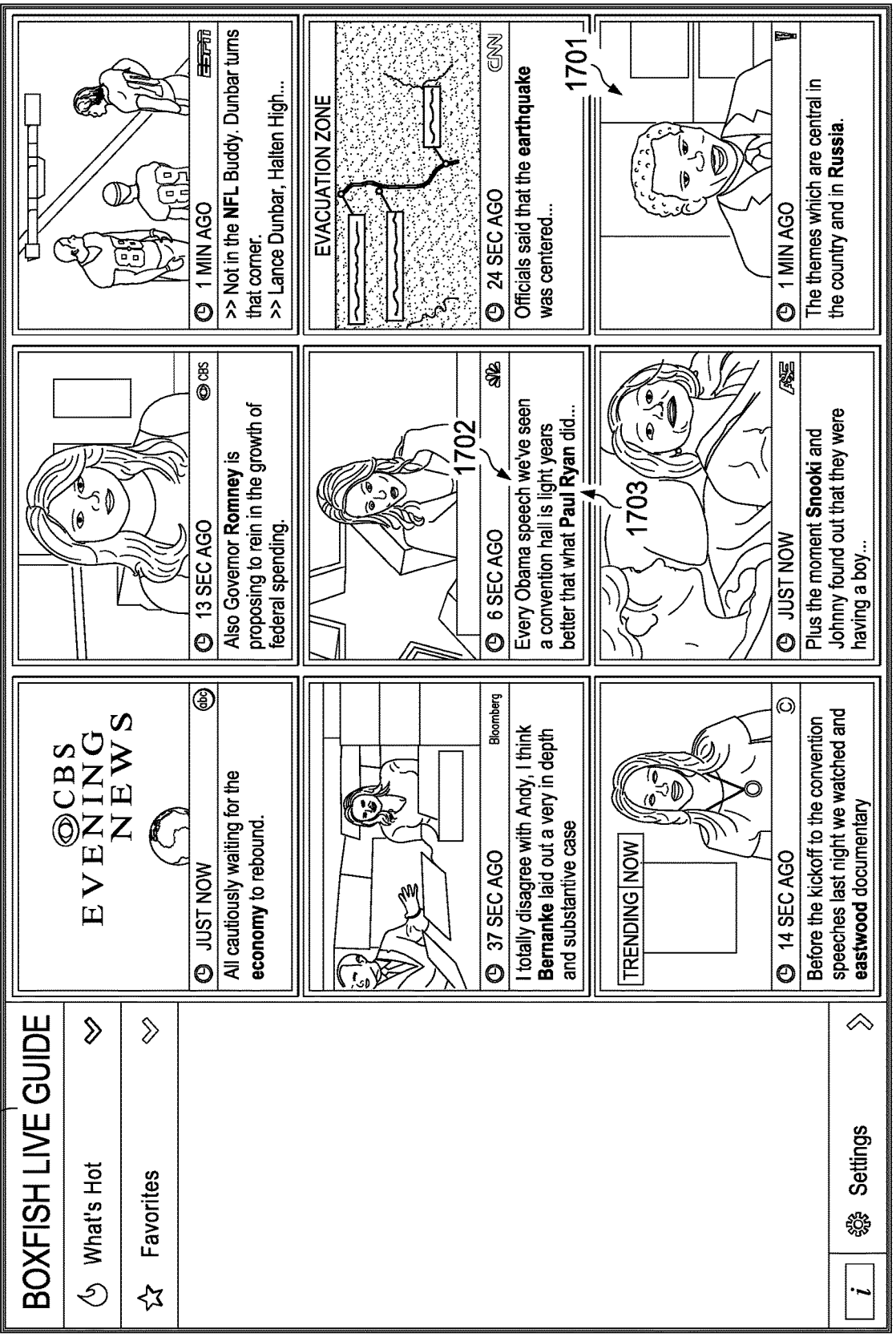
FIG. 17 illustrates another example of a user interface of the Boxfish technology.

Shown in FIG. 17 is a tiled view in which the user, according to the channel preferences, could see nine different image thumbnails 1701 and the text associated with each of these thumbnails 1702. That text 1702 is updated periodically in real time and can be designed to scroll beneath each of the thumbnails. Certain entities or topics are identified in 1703. To the left of these nine tiles 1701 is a user application 1704 that gives the user the ability to find his favorite channels that will be presented here and provides various preset settings such as sports, what's hot, news channels, entertainment and such. Each of these settings is a preconfigured option that provides a distinctive advantage over previously known embodiments in set-top boxes where only certain defined channels were presented with information and without associated text. In these prior applications, no ability to use text searching was provided to search what's hot or according to defined user keywords.

Each image tile 1701 is updated periodically with interesting sentences using a mechanism that displays or abandons sentences according to whether or not they contain meaningful entities. Each tile 1701 updates either every ten seconds or whenever a keyword is spoken on TV. This functionality happens in a sub process of a topic extraction. The main point being that the system can provide, in a user efficient fashion, user relevant text that goes with these various image tiles 1701. The Image Server 1009 provides images and the Index of TV 1015 provides the text that goes below each tile 1701. The EPG Nielsen data 1011 is fed in along with local programming channel data in order to provide contextual information about the channels provided. This information includes, for users whose set-top box is not directly compatible with the application, a display of what channel to tune to.

B. Tile Option View

Figure 18:
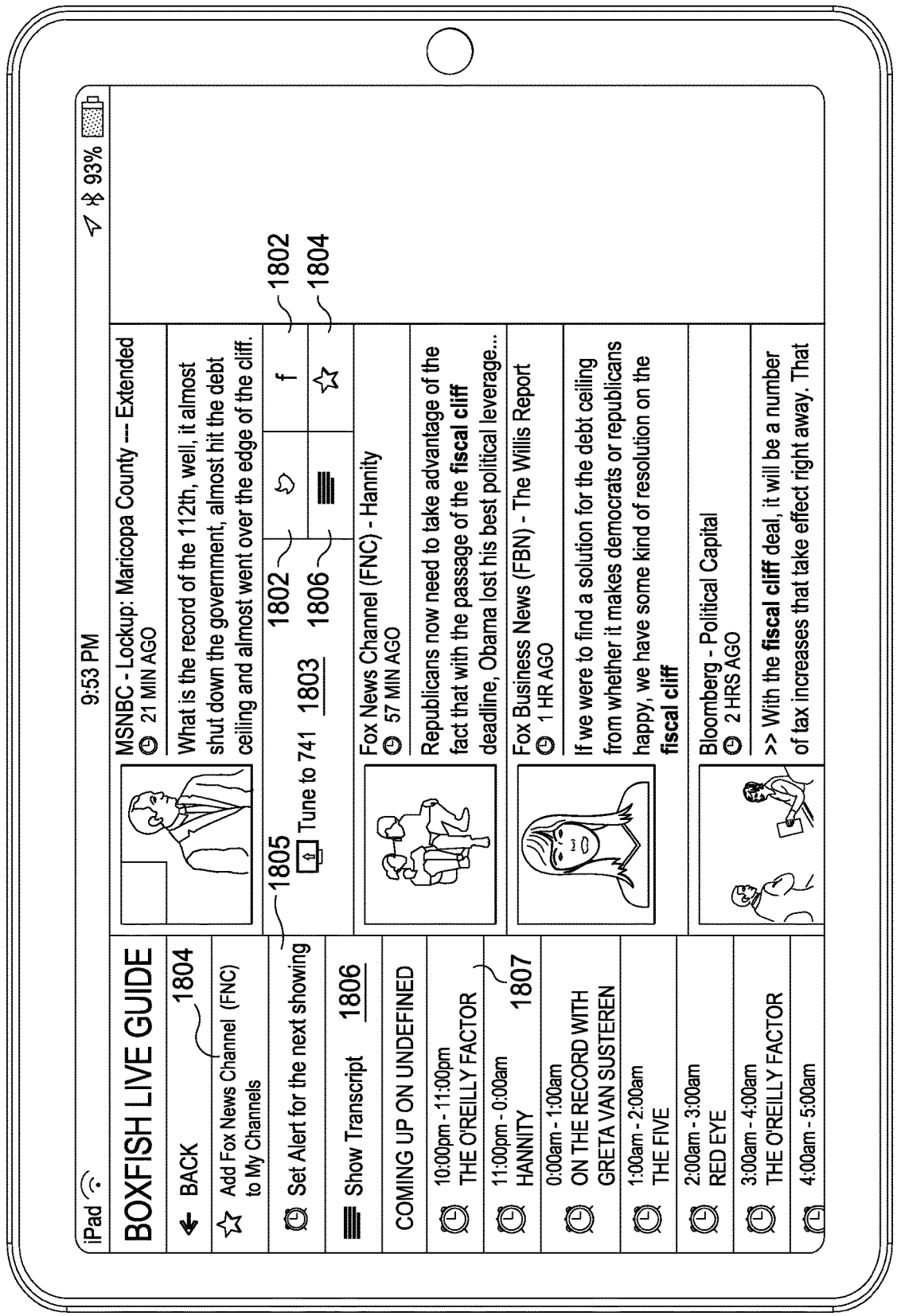
FIG. 18 illustrates another example of the user interface of the Boxfish technology that has been expanded to display channel options.

Each tile 1701 has additional option available to a user, such that if a user taps on a tile 1701, the tile flips over to display these additional options illustrated in FIG. 18. These additional options include:

1. To Connect to a Social Media Website 1802

This button allows a user to post a clip of the transcript to a social media website such as Facebook or twitter.

2. To Tune to a Channel 1803

This button allows a user to interact with their set top box and tune to the tile 1701's channel. If interaction between the application and the set top box is not possible, this button is replaced with a note detailing what channel the user should tune to if they wish to watch the current program.

3. To Add the Channel to the My Channels 1804,

This button allows a user to add the tile 1701's channel to her favorites list, which is displayed when the user accesses their custom channels.

4. To Set Alerts 1805

This button allows a user to set an email alert to notify them when the tile 1701's displayed program is playing again, or when to alert them to the next mention of a specific topic keyword. In another embodiment, the button may be referred to as an alarm.

5. To display a Transcript 1806

This button allows a user to display the transcript of the Tile 1701's channel.

An embodiment of FIG. 18 also displays a play bar (not shown), which displays how much of the program is left. Furthermore, "Coming Up on Undefined" 1807 is provided at the bottom left-hand corner that lists upcoming shows and their play times. For example, "The O'Reilly Factor" is provided with its play time 10:00 pm-11:00 pm.

Other similar applications allow for automatic tuning to a channel when a specific television program is playing, but the user doesn't necessarily know if the topic of that episode has anything to do with any of their interests. For example, CNN will always have news at eight, however the stories being displayed on CNN may not necessarily be relevant to a specific user's interests all of the time. Such that if the user is interested in politics but not in sports, that user would only tune to CNN in regards to politics. Other applications display that CNN is currently showing news, but not what that news is about. So if a user interested in politics has to physically tune to that channel they have no way of knowing if CNN is currently running a story on politics or sports.

The application has the capability to connect to a user's Wi-Fi network in order to control the user's set top box. However, it is also able to search TV storage components such as DVR and TiVo for key and trending words, and gives the user the option to begin playing stored TV programs from the point where these keywords are mentioned. So if a user does a search for Giants and their TV storage component has CNN sports center recorded, the application will display that the user has this program recorded and give the user the option to begin playing the program just before the point where that trending keyword was mentioned. The index of TV stores metadata about the spoken words and the time period within a program that the word was spoken. Other metadata includes channel description, title, cast, program, locations, specific people, and other information that allows the application to make reasonable guesses about a user's tastes based on their interaction with a given television program.

C. Tiles Favorite View

Figure 19:
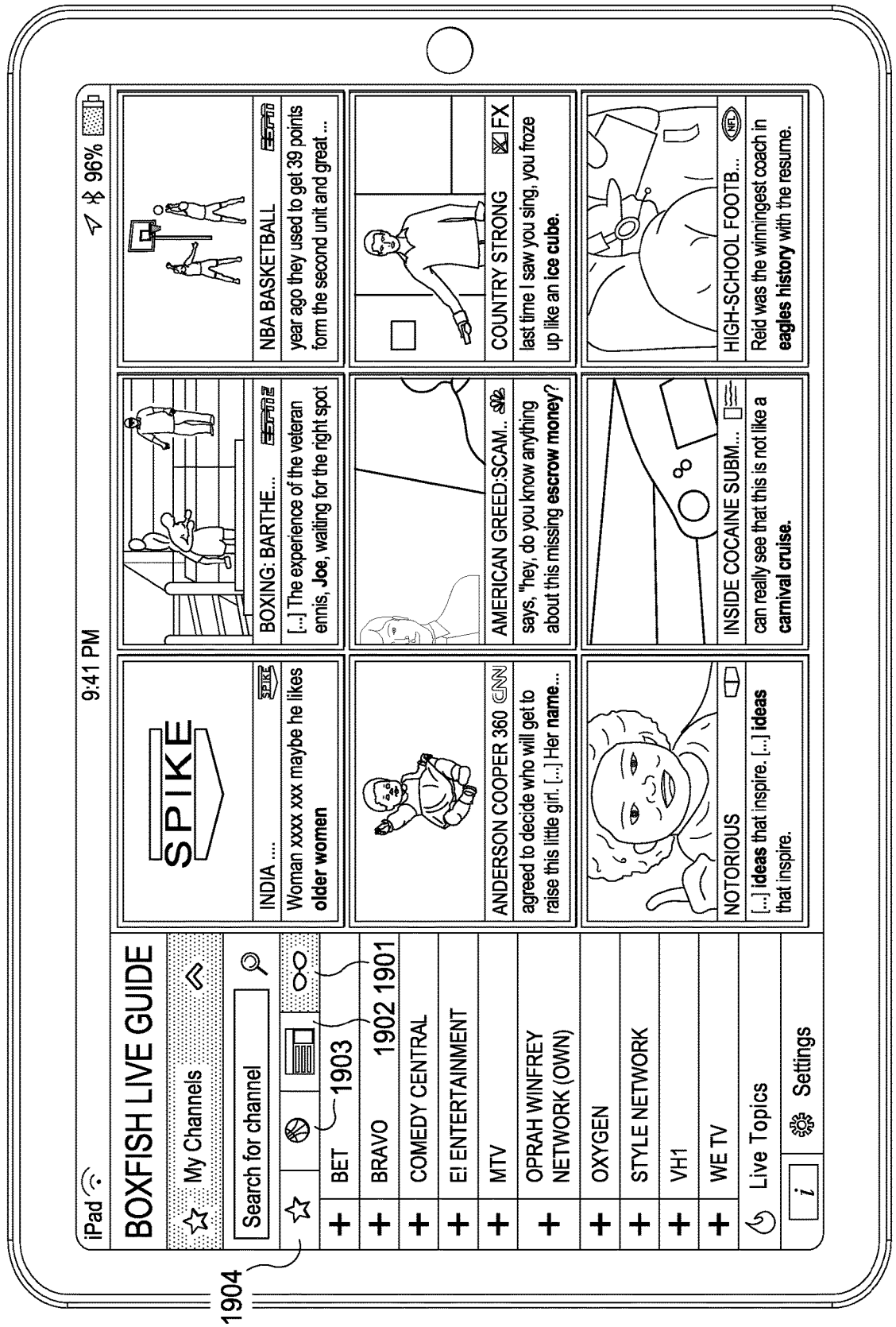
FIG. 19 illustrates another example of the user interface of the Boxfish technology such that "My Channels" option has been expanded to display its capabilities in regards to customizing entertainment channels.

FIG. 19 shows the My Channels 1804 panel expanded to display the user's available options. Celebrity channels 1901 displays trends relating to celebrity gossip, news channels 1902 displays current trending news stories, sports channels 1903 displays current trending sports channels, and My Favorites 1904 displays channels the user has hand-picked using the select channel button for My Channels 1804.

D. Search View

FIG. 20 displays the results within the user interface that are produced as a result of the user searching for a specific keyword. When a keyword is typed into the search bar 2003, the application does a historic search for all references of the searched keyword and displays the most current and relevant instances of that word in the standard nine tile 1701 view on the right-side of the screen. This screen also provides the user with a histogram 2001 of how frequently the searched keyword has been mentioned. The user is also given the option to set an alert for the next mention 2002 of the specific keyword.

XI. Trending TV Components

A. Trending—Trending TV by Genre Based on Words Spoken ON Television (not on Social Networks about TV)

Trending Television is displayed in a nine-tile 1701 pattern across the user interface. These tiles 1701 continually update according to what is happening on the show currently displaying, or should that show deviate from a trending topic, have the capability to update according to other trending keywords.

These trending keywords are based on trending algorithms that decide what is unusual, breaking, unique, or currently interesting. The application tends to show sports and news as these things tend to be talked about in clusters then never mentioned again, but users have the capability to modify their settings based on their interests. Each tile 1701 can be tapped to open additional information displayed, including live feed and a transcript of the program. Tapping on a tile 1701 also opens an option menu on FIG. 18, which allows the user to set alerts to show the next mention of the phrase that caused the topic to be considered trending, to set alerts to show the next showing of that program, or to add that channel to the user's favorites. A user can also choose subcategories of trending TV which allows them to view specific subjects such as sports or news.

B. Favorites (My Channels)—View Spoken Words on Your Favorite Channels in Real-Time This functionality is basically a TV guide which displays in a grid view of television and updates in real time. It is different from traditional TV guides because instead of displaying spreadsheet data, such as start and end times, it displays a grid of the user's favorite channels and updates them according to what is happening in real time on those channels. A user can choose the channels that they normally watch and add them to the My Channels feature. They can also view categories such as sports, news, and celebrity channels, in addition to their hand-picked channels. My Channels data is inputted according to a user's preferences and allows the user to keep a customizable list of channels bookmarked. These bookmarked channels also provide the User database with context from which to determine a user's interests and further customize its provided information. The user can also create a customized set of keywords that the application will search for in real time.

C. Search—Search Words Spoken on TV

This option gives the user a historic results list of the mentions of the searched word on TV. The application also displays a series of metrics that revolve around the searched word, such as frequency of mentions on TV. The searching option allows a user to search current trends using metrics according to keywords.

D. Tile 1701 Functionality

Each tile 1701 that appears in the app has an extended list of features that are accessed by tapping on that tile 1701. These features include options for sharing the channel or components of the transcript on a social media website, adding that channel to the user's favorites, setting an alert for the next mention of the word of phrase that caused that channel to be part of the trending display, or setting an alert for the next time the program that the tile 1701 currently displays comes on.

E. Change Channel—Ability to Tune to a Program Based on a Trending Word

The application has the ability to change channels according to what trending keywords are either being searched or viewed. When a user taps on a channel tile 1701, the tile 1701 flips over and immediately begins playing the selected channel. If the app is connected to an IPTV capable system, the app can remotely change the channel on a TV to show the channel selected.

F. Alerts—Alerted when a Keyword is Mentioned on Television

The application has the ability to send an email alert to a user when a previously selected keyword is mentioned. Mechanisms are in place to keep the user from being bombarded with emails if a keyword suddenly becomes popular.

G. DVR/VOD—Deep Search DVR

Within results according to any search, the application can search a user's DVR device. If a keyword is mentioned on a stored program, the application can include that program in the list of items it displays relevant to a user's search query.

H. DVR/VOD—Tune to Word/Time within Recording

If a user selects a search result that is stored on a device on the system, a user can start the program at the beginning, or just before the keyword was mentioned.

I. Commerce—Buy Goods Based on Words Spoken on TV (Adwords for TV)

When a keyword is spoken relevant to a specific item (for example a Gucci Handbag) the application is capable of providing the user a link to the Gucci website.

XII. GLOSSARY OF TERMS

API (Application Programming Interface): An API is a source code-based specification intended to be used as an interface by software components to communicate with each other. An API may include specifications for routines, data structures, object classes, and variables.

CDN (Content Distribution Network): A CDN is a system of computers containing copies of data placed at various nodes of a network. When properly designed and implemented, a CDN can improve access to the data it caches by increasing access bandwidth and redundancy, and reducing access latency.

Redundancy: Redundancy within a computer network means that multiple versions of a single piece of data exist in multiple places across a network. This is useful because it means that a program searching for this information is more likely to find it, needs less bandwidth to continue its search, and, in the case of damage to a physical server, the data isn't truly gone because other copies of that data exist elsewhere.

Client: Client, at least in the context of this document, is meant to indicate a program that interacts with the main Real-time Delivery of Segmented Video, but is not a part of it. A client can be can be anything from a mobile phone app to a web-based user interface. For the most part, clients are used by users to access the database and retrieve data.

Client Devices: A Client Device is any device that runs a client program, such as an APPLE IPHONE, an ANDROID capable phone, or a TV with IPTV capabilities.

Cloud: Cloud infrastructure or simply "the cloud" is a system of data organization in which pieces of data are scattered across a network of physical servers. These servers can be pretty much anywhere in regards to their physical location, but are all linked by a common cloud network. Cloud infrastructure has many benefits, including a massive capability for redundancy, a capability to store and efficiently use local and regional data, and a network that will lose little data in the case that a physical server is damaged.

DVB (Digital Video Broadcasting): DVB is a suite of internationally accepted open standards for digital television. DVB standards are maintained by the DVB Project, an international industry consortium with more than 270 members, and they are published by a Joint Technical Committee (JTC) of European Telecommunications Standards Institute (ETSI), European Committee for Electrotechnical Standardization (CENELEC) and European Broadcasting Union (EBU).

EPG (Electronic Programming Guide): EPG provides users of television, radio, and other media applications with continuously updated menus displaying broadcast programming or scheduling information for current and upcoming programming.

Function: Function, at least in regards to the context of this document, is used to describe any task that a program or a component of a program is designed to do. For example, "The Capture Platform 110 provides a number of functions:" simply means that the Capture Platform 110 has the capability of performing a number of tasks.

IPTV (Internet Protocol Television): IPTV is a system in which television services are delivered using the Internet or a similar wide-scale network, instead of using traditional terrestrial, satellite signal, and cable television formats.

JSON (JavaScript Object Notation): JSON is a lightweight text-based open standard designed for human-readable data interchange.

Line 21: Line 21 (or EIA-608) is the standard for closed captioning in the United States and Canada. It also defines Extended Data Service, a means for including information, such as program name, in a television transmission.

Long-Form Video: Long-Form video, at least within the context of this document, simply refers to video data before it has been processed. The actual length of the video may vary, but in most cases it can be assumed to be about the length of a television show or movie.

Media RSS: RSS, originally called RDF site summary, is a family of web feed formats used to publish frequently updated works. Media RSS simply refers to an RSS feed that is used for media.

OCR: Optical character recognition, or OCR, is the mechanical or electronic translation of scanned images of handwritten, typewritten or printed text into machine-encoded text. This conversion is used by the System 100 to translate close captioned text into a form that the Search Platform 120 is capable of reading.

RAID (Redundant Array of Independent Disks): RAID is a storage technology that combines multiple Physical storage servers so that they function as a single unit. This single unit, known as a Logical unit, doesn't require that the servers be physically close, only that they are linked by a network. Data is distributed across the drives in one of several ways called "RAID levels," depending on what level of redundancy and performance (via parallel communication) is required.

Relational Database Management System (RDBMS): RDBMS is a Database Management System in which data is stored in tables and the relationships between the data are also stored in tables. The data can be accessed or reassembled in many different ways without requiring that the tables be changed.

Representational State Transfer (REST): REST is a form of software architecture for distributed hypermedia systems such as the World Wide Web. REST style architectures consist of clients and servers. Clients send requests to servers; servers process requests and return appropriate responses.

Social Graph: A social graph is a collection of data points that represent a person's interests and how those interests interact. Social graphs can be expanded to include information about a group of people or about a group of interests shared by multiple people.

Topic: A topic, according to this system, is a basic description of a chunk of video. The topic can be broad, such as "Sports" or "News" or specific, such as "Lady Gaga" or "Bill Gates." A chunk of video can have as many topics as is required to describe it. These topics are what the search platform 120 looks for when it attempts to find relevant videos to a search queue.

User: A user is anyone using the System 100 or one of its clients.

XIII. SUMMARY

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present provisional patent application.

For example, as referred to herein, a machine or engine may be a virtual machine, computer, node, instance, host, or machine in a networked computing environment. Also as referred to herein, a networked computing environment is a collection of machines connected by communication channels that facilitate communications between machines and allow for machines to share resources. Network may also refer to a communication medium between processes on the same machine. Also as referred to herein, a server is a machine deployed to execute a program operating as a socket listener and may include software instances.

In all descriptions of "servers" or other computing devices herein, whether or not the illustrations of those servers or other computing devices similarly show a server-like illustration in the figures, it should be understood that any such described servers or computing devices will similarly perform their described functions in accordance with computer-readable instructions stored on a computer-readable media that are connected thereto.

Resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method comprising:
   receiving, by a computing device, a first search term;
   identifying by the computing device, one or more second search terms relating to the first search term;
   determining a plurality of audiovisual content items in which the first search term is spoken;
   causing output, at a first time, of a plurality of image tiles corresponding to the plurality of audiovisual content items, wherein a first image tile of the plurality of image tiles comprises:
   a thumbnail image associated with a first audiovisual content item of the plurality of audiovisual content items; and
   a first transcript portion associated with the first audiovisual content item and comprising the first search term;
   detecting, after the causing the output of the plurality of image tiles, an occurrence of the one or more second search terms being spoken in the first audiovisual content item at a second time later than the first time by monitoring, during output of the plurality of image tiles, a transcript of the first audiovisual content item;
   based on the receiving the first search term, and based on detecting the occurrence of the one or more second search terms after the causing the output of the plurality of image tiles, replacing, during output of the plurality of image tiles, the first transcript portion with a second transcript portion that comprises the one or more second search terms;
   receiving, from a user device, a selection of the first image tile; and
   causing, via a display, playback of the first audiovisual content item, wherein the playback begins at a playback time corresponding to the new-occurrence of the one or more second search terms in the first audiovisual content item.

2. The method of claim 1, wherein the replacing the first transcript portion is further based on one or more of:
   entities corresponding to the first search term,
   co-occurrences of the entities in a database, or
   a different mention of the first search term in a different content item.

3. The method of claim 1, wherein the replacing the first transcript portion comprises determining trending results in a particular geographic region.

4. The method of claim 1, wherein the replacing the first transcript portion comprises determining trending results corresponding to a particular genre.

5. The method of claim 1, wherein the replacing the first transcript portion with the second transcript portion comprises:
   determining entities corresponding to the first search term by:
   extracting individual words from a database;
   determining that a plurality of different words of the individual words relate to the same entity; and
   normalizing a plurality of entities respectively associated with the plurality of different words to comprise a common representation of the same entity; and
   determining a frequency of mentions of each of the normalized plurality of entities.

6. The method of claim 1, wherein the replacing the first transcript portion comprises determining trending results corresponding to a source of content item.

7. The method of claim 1, wherein the replacing the first transcript portion comprises:
   determining entities corresponding to the first search term; and
   determining trending results based on how frequently each entity of the entities occurs in a database by comparing a percentage of change of a plurality of phrases mentioned in the database against historic frequency metrics for each of the plurality of phrases.

8. The method of claim 1, further comprising:
   causing, based on a frequency of mentions of the first search term, the user device to output an advertisement.

9. The method of claim 1, further comprising:
   recognizing an advertisement in a database; and
   filtering the advertisement from being outputted in the plurality of audiovisual content items in which the first search term is spoken.

10. The method of claim 1, comprising:
    storing, in a database, frequency counts of how often any two entities co-occur in one or more of the plurality of audiovisual content items, wherein the frequency counts are based on a time and a date of each co-occurrence, wherein the replacing the first transcript portion comprises querying the database for the first search term.

11. The method of claim 1, wherein the replacing the first transcript portion comprises comparing the first search term to a threshold.

12. The method of claim 1, wherein each image tile, of the plurality of image tiles, further comprises a time elapsed since the search term was mentioned in a corresponding audiovisual content item.

13. The method of claim 1, wherein the first audiovisual content item is a live content item, and wherein the occurrence of the one or more second search terms is detected after the causing output of the plurality of image tiles.

14. The method of claim 1, further comprising:
    receiving, at a third time, a user request to be notified of future occurrences of the first search term being spoken in any of the plurality of audiovisual content items;
    determining, during the playback of the first audiovisual content item, an occurrence of the first search term being spoken in a second audiovisual content item of the plurality of audiovisual content items at a fourth time later than the third time; and
    outputting a notification that:
       partially overlays a portion of the first audiovisual content item;
       indicates the search term; and
       comprises a second thumbnail image corresponding to the second audiovisual content item.

15. The method of claim 1, wherein the first image tile further comprises an indication of a time of a new occurrence of the first search term.

16. The method of claim 1, replacing the thumbnail image with a second thumbnail image associated with the new-occurrence of the one or more second search terms in the first audiovisual content item.

17. The method of claim 1, wherein the first audiovisual content item is a live audiovisual content item, and wherein the method further comprises continuing to update the first image tile as the first search term is detected in a transcript corresponding to the live audiovisual content item.

18. The method of claim 1, further comprising updating the first image tile periodically at predetermined time intervals.

19. A method comprising,
    receiving, by a computing device, a user preference related to a topic by receiving a first search term;
    determining, based on the topic, a plurality of words comprising the first search term by identifying one or more second search terms relating to the first search term;
    causing, at a first time and based on detection of at least one first word of the plurality of words spoken in a plurality of content items, output of one or more image tiles corresponding to one or more mentions of the topic in the plurality of content wherein a first image tile of the one or more image tiles comprises:
       a thumbnail image associated with a first content item of the plurality of content items; and
       a first transcript portion associated with the first content item and comprising the at least one first word; and
    based on the receiving the user preference related to the topic, and after causing output of the one or more image tiles, continuing to monitor for additional detection of any one of the plurality of words spoken in the plurality of content items by monitoring, during output of the one or more image tiles, one or more transcripts of the plurality of content items; and
    replacing, based on a most recent detection of at least one second word of the plurality of words spoken in the first content item at a second time after the first time, and based on the receiving the user preference related to the topic, the first transcript portion with a second transcript portion that comprises the at least one second word of the plurality of words.

20. The method of claim 19, further comprising:
    outputting, based on a mention of the topic in a second content item of the plurality of content items, a notification that comprises an option to view the second content item, wherein a selection of the option causes output of the second content item.

21. The method of claim 19, wherein the plurality of content items comprises a plurality of video programs.

22. The method of claim 19, wherein the first image tile further comprises a time elapsed since the most recent detection of the at least one second word in the first content item.

23. The method of claim 19, further comprising:
    periodically updating at least one of the one or more image tiles.

24. The method of claim 19, further comprising:
    during playback of the first content item, based on determining an occurrence of one or more of the plurality of words in a second content item of the plurality of content items, outputting a notification that partially overlays a portion of the first content item and indicates that the topic was mentioned in the second content item.

25. The method of claim 19, wherein the first image tile further comprises:
    a time of a most recent mention of the topic.

26. The method of claim 19, further comprising replacing the thumbnail image with a second thumbnail image associated with the most recently detected one or more of the plurality of words.

27. A method comprising:
    receiving, by a computing device, a first search term;

identifying, by the computing device, one or more second search terms relating to the first search term;

outputting a listing of a plurality of image tiles corresponding to a plurality of audiovisual content items in which the first search term is spoken, wherein a first image tile of the plurality of image tiles comprises:
- a thumbnail image associated with the-a first audiovisual content item of the plurality of audiovisual content items; and
- a transcript portion associated with the first audiovisual content item and comprising the first search term;

receiving, at a first time, a user request to be notified of future occurrences of the first search term being spoken in any of the plurality of audiovisual content items;

monitoring, based on the user request and during output of the listing of the plurality of image tiles, changes to transcripts of the plurality of audiovisual content items; and based on receiving a selection of the first image tile in the listing:
- causing output of the first audiovisual content item;
- determining, based on the monitoring, during the output of the listing of the plurality of image tiles, based on the changes to the transcripts, and based on the user request, an occurrence of the one or more second search terms being spoken in a second audiovisual content item, of the plurality of audiovisual content items, at a second time later than the first time; and
- based on the user request, based on the occurrence of the one or more second search terms being spoken in the second audiovisual content item, and based on receiving the user request, outputting a notification that partially overlays a portion of the first audiovisual content item and indicates that the one or more second search terms were spoken in the second audiovisual content item.

28. The method of claim 27, wherein the notification that partially overlays the portion of the first audiovisual content item comprises an option to output the second audiovisual content item.

29. The method of claim 28, further comprising:
causing, based on a selection of the option, replacement of output of the first audiovisual content item with output of the second audiovisual content item.

30. The method of claim 27, wherein the notification that partially overlays the portion of the first audiovisual content item comprises a user interface element for recording the second audiovisual content item.

31. The method of claim 27, wherein outputting the listing of the plurality of image tiles comprises:
updating, based on the occurrence, a second image tile corresponding to the second audiovisual content item.

32. The method of claim 27, wherein the first image tile further comprises:
a time of a most recent occurrence of the first search term in the first audiovisual content item.

\* \* \* \* \*